United States Patent
Mildh et al.

(10) Patent No.: US 10,952,278 B2
(45) Date of Patent: Mar. 16, 2021

(54) SMALL DATA USER PLANE TRANSMISSION FOR CELLULAR INTERNET OF THINGS (CIOT)

(71) Applicant: Telefonaktiebolaget LM Ericsson (publ), Stockholm (SE)

(72) Inventors: Gunnar Mildh, Sollentuna (SE); Qian Chen, Mölndal (SE); Mohammed Yazid Lyazidi, Hässelby (SE); Ulf Mattsson, Kungsbacka (SE); Hans Bertil Rönneke, Kungsbacka (SE); Paul Schliwa-Bertling, Ljungsbro (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/344,925

(22) PCT Filed: Feb. 19, 2019

(86) PCT No.: PCT/SE2019/050150
§ 371 (c)(1),
(2) Date: Apr. 25, 2019

(87) PCT Pub. No.: WO2019/164439
PCT Pub. Date: Aug. 29, 2019

(65) Prior Publication Data
US 2020/0170071 A1    May 28, 2020

Related U.S. Application Data

(60) Provisional application No. 62/632,837, filed on Feb. 20, 2018.

(51) Int. Cl.
H04W 80/08    (2009.01)
H04W 76/12    (2018.01)
(Continued)

(52) U.S. Cl.
CPC ............. *H04W 80/08* (2013.01); *H04L 67/12* (2013.01); *H04W 8/18* (2013.01);
(Continued)

(58) Field of Classification Search
CPC ..... H04W 80/08; H04W 76/11; H04W 76/12; H04W 76/16; H04W 8/18; H04W 12/0013; H04L 67/12
(Continued)

(56) References Cited

U.S. PATENT DOCUMENTS

2017/0048684 A1    2/2017    Rönneke et al.
2017/0086062 A1    3/2017    Chen
(Continued)

FOREIGN PATENT DOCUMENTS

WO    2018030826 A1    2/2018

OTHER PUBLICATIONS

"3GPP TR 23.724 V2.0.0", 3rd Generation Partnership Project; Technical Specification Group Services and System Aspects; Study on Cellular IoT support and evolution for the 5G System (Release 16), Dec. 2018, pp. 1-276.
(Continued)

*Primary Examiner* — Joel Ajayi
(74) *Attorney, Agent, or Firm* — Sage Patent Group

(57) ABSTRACT

Exemplary embodiments include methods performed by a cellular Internet of Things, CIoT, user equipment, UE, for transmission of data in a communication network comprising a radio access network, RAN, and a core network, CN. Embodiments include sending, to an Access and Mobility Management Function, AMF, a request to establish a small-data user-plane, SDUP, data session. Embodiments can also include receiving a response indicating that the requested SDUP data session is established. The response can include an identifier associated with a user-plane function, UPF,
(Continued)

within the CN, that supports the established SDUP data session. The response can also include an SDUP security configuration for communication between the UE and the CN during the established SDUP data session. Embodiments can also include subsequently communicating user data, associated with the established SDUP data session, with the UPF via a serving node in the RAN. Other embodiments include complementary methods performed by AMFs and serving nodes, as well as UEs and network nodes configured to perform the exemplary methods.

16 Claims, 14 Drawing Sheets

(51) Int. Cl.
　　*H04W 76/11*　　　(2018.01)
　　*H04W 76/16*　　　(2018.01)
　　*H04W 12/00*　　　(2021.01)
　　*H04L 29/08*　　　(2006.01)
　　*H04W 8/18*　　　(2009.01)
(52) U.S. Cl.
　　CPC ........ *H04W 12/0013* (2019.01); *H04W 76/11* (2018.02); *H04W 76/12* (2018.02); *H04W 76/16* (2018.02)
(58) Field of Classification Search
　　USPC .............................................. 455/432.3, 433
　　See application file for complete search history.

(56) References Cited

U.S. PATENT DOCUMENTS

| | | | |
|---|---|---|---|
| 2018/0199243 A1* | 7/2018 | Bharatia | H04W 36/0027 |
| 2018/0199279 A1* | 7/2018 | Baek | H04W 28/08 |
| 2019/0116631 A1* | 4/2019 | Talebi Fard | H04W 80/10 |

OTHER PUBLICATIONS

"3GPP TR 23.887 V12.0.0", 3rd Generation Partnership Project; Technical Specification Group Services and System Aspects; Study on Machine-Type Communications (MTC) and other mobile data applications communications enhancements (Release 12), Dec. 2013, pp. 1-151.

"3GPP TR 38.913 V14.3.0", 3rd Generation Partnership Project; Technical Specification Group Radio Access Network; Study on Scenarios and Requirements for Next Generation Access Technologies; (Release 14), Jun. 2017, pp. 1-39.

"3GPP TS 33.401 V14.5.0", 3rd Generation Partnership Project; Technical Specification Group Services and System Aspects; 3GPP System Architecture Evolution (SAE); Security architecture (Release 14), Jan. 2018, pp. 1-153.

"3GPP TS 38.300 V15.0.0", 3rd Generation Partnership Project; Technical Specification Group Radio Access Network; NR; NR and NG-RAN Overall Description; Stage 2 (Release 15), Dec. 2017, pp. 1-68.

"3GPP TR 36.888 V12.0.0", 3rd Generation Partnership Project; Technical Specification Group Radio Access Network; Study on provision of low-cost Machine-Type Communications (MTC) User Equipments (UEs) based on LTE (Release 12), Jun. 2013, pp. 1-55.

"3GPP TS 23.501 V2.0.0", 3rd Generation Partnership Project; Technical Specification Group Services and System Aspects; System Architecture for the 5G System; Stage 2 (Release 15), Dec. 2017, pp. 1-183.

"3GPP TR 38.801 V1.2.0", 3rd Generation Partnership Project; Technical Specification Group Radio Access Network; Study on New Radio Access Technology; Radio Access Architecture and Interfaces (Release 14), Feb. 2017, pp. 1-90.

"3GPP TR 45.820 V13.1.0", 3rd Generation Partnership Project; Technical Specification Group GSM/EDGE Radio Access Network; Cellular system support for ultra-low complexity and low throughput Internet of Things (CIoT) Release 13), Nov. 2015, pp. 1-145.

"3GPP TS 22.261 V16.1.0", 3rd Generation Partnership Project; Technical Specification Group Services and System Aspects; Service requirements for the 5G system; Stage 1 (Release 16), Sep. 2017, pp. 1-52.

"3GPP TS 38.401 V15.0.0", 3rd Generation Partnership Project; Technical Specification Group Radio Access Network; NG-RAN; Architecture description (Release 15), Dec. 2017, pp. 1-23.

* cited by examiner

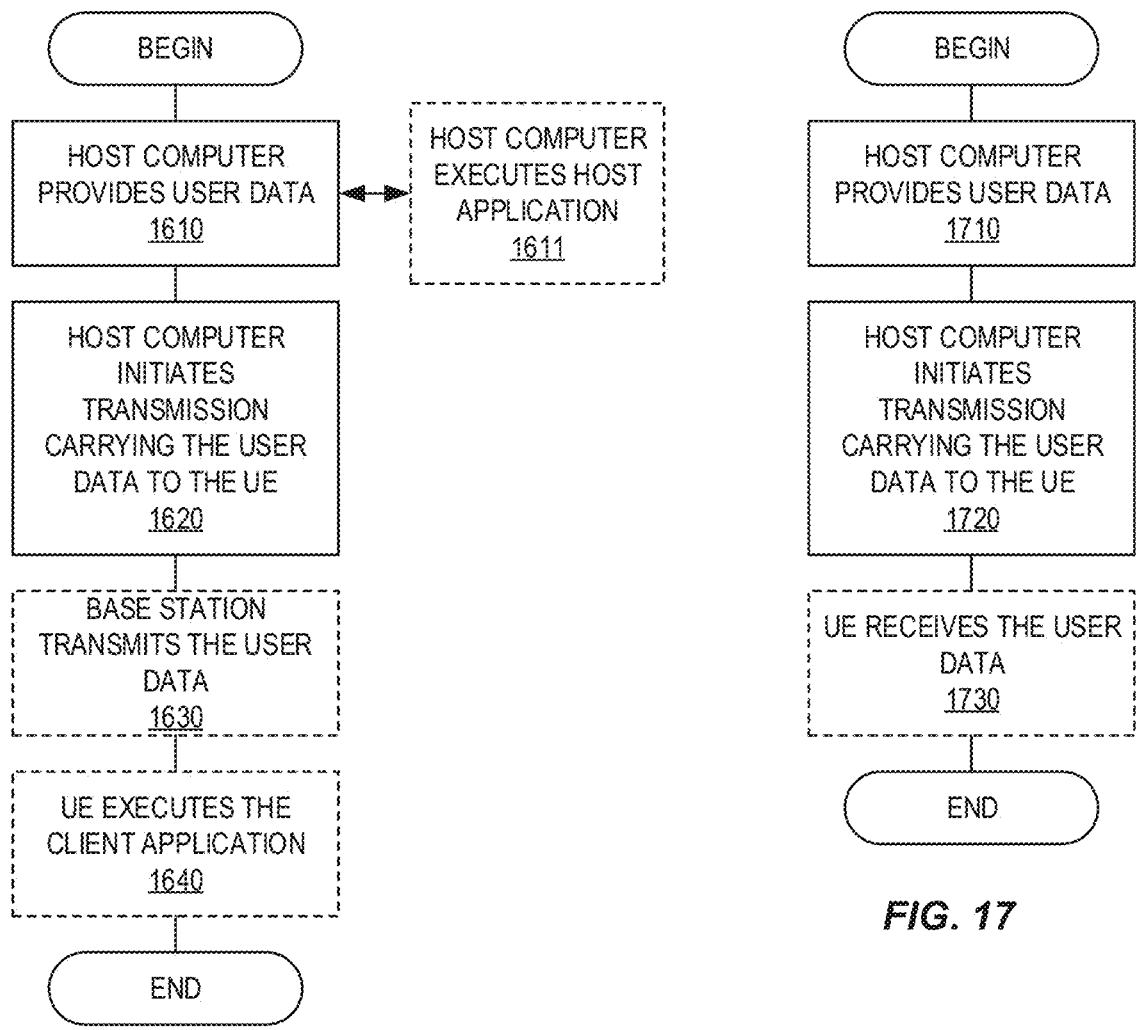

SMALL DATA USER PLANE TRANSMISSION FOR CELLULAR INTERNET OF THINGS (CIOT)

TECHNICAL FIELD

The present application relates generally to the field of wireless communication networks, and more specifically to improvements that facilitate infrequent transmission and/or reception of small amounts of data by devices (e.g., Internet of Things devices) operating in wireless communication networks.

BACKGROUND

Multi-connectivity (also referred to as "dual connectivity" or "DC") can be envisioned as an important feature for fifth-generation (5G) RAN architectures standardized by 3GPP. FIG. 1 illustrates a high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect to the NR interface to UEs, each of the gNBs can support frequency division duplexing (FDD), time division duplexing (TDD), or a combination thereof.

The NG RAN logical nodes shown in FIG. 1 (and described in TS 38.401 and TR 38.801) include a central (or centralized) unit (CU or gNB-CU) and one or more distributed (or decentralized) units (DU or gNB-DU). For example, gNB 100 in FIG. 1 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Furthermore, the F1 interface between the gNB-CU and gNB-DU is specified, or based on, the following general principles:
  F1 is an open interface;
  F1 supports the exchange of signaling information between respective endpoints, as well as data transmission to the respective endpoints;
  from a logical standpoint, F1 is a point-to-point interface between the endpoints (even in the absence of a physical direct connection between the endpoints);
  F1 supports control plane (CP) and user plane (UP) separation, such that a gNB-CU may be separated in CP and UP;
  F1 separates Radio Network Layer (RNL) and Transport Network Layer (TNL);
  F1 enables exchange of user-equipment (UE) associated information and non-UE associated information;
  F1 is defined to be future proof with respect to new requirements, services, and functions;
  A gNB terminates X2, Xn, NG and S1-U interfaces;
  In the architecture identified by CUs and DUs, dual connectivity (DC) can be achieved by means of allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

FIG. 2 further illustrates the 5G network architecture comprising NG-RAN and 5GC. As shown in the figure, gNBs 210 (e.g., 210a,b) and ng-eNBs 220 (e.g., 220a,b) are interconnected with each other via the Xn interface. The gNBs and ng-eNBs are also connected via the NG interfaces to the 5GC, more specifically to the AMF (Access and Mobility Management Function) 230 (e.g., AMFs 230a,b) via the NG-C interface and to the UPF (User Plane Function) 240 (e.g., UPFs 240a,b) via the NG-U interface. Note that the term "ng-eNB" is often used to refer to an eNB with an LTE radio interface that can connect to the 5GC via the NG interface.

FIG. 3 further illustrates the 5G network architecture from a reference point perspective. In the architecture shown in FIG. 3, the following reference points are defined:
N1: Reference point between the user equipment (UE) and the AMF.
N2: Reference point between the (R)AN (e.g., NG-RAN) and the AMF.

N3: Reference point between the (R)AN (e.g., NG-RAN) and the UPF.

N4: Reference point between the Session Management Function (SMF) and the UPF.

N6: Reference point between the UPF and a Data Network (DN) (e.g., Internet).

As shown in the above figures, UPF(s) handle the user plane path of PDU sessions between a UE and the DN. 3GPP specifications support deployments with a single UPF or multiple UPFs for a given PDU Session. UPF selection is performed by SMF. The number of UPFs supported for a PDU Session is unrestricted. For IPv4 or IPv6 type PDU Sessions, the PDU Session Anchor may be IP anchor point of the IP address/prefix allocated to the UE. For an IPv4 type PDU Session or an IPv6 type PDU Session without multi-homing, when multiple PDU Session Anchors are used, only one PDU Session Anchor is the IP anchor point for the PDU Session.

Machine to Machine (M2M) communication—also referred to as Machine Type Communication (MTC)—represents a significant growth opportunity for the 3GPP ecosystem. To support the so called 'Internet of Things' (IoT), 3GPP operators have to address usage scenarios with devices that are power efficient (with battery life of several years), can be reached in challenging coverage conditions (e.g., indoor and basements) and, more importantly, are cost-effective so that they can be deployed on a mass scale and even be disposable. A further requirement on the 3GPP IoT ecosystem is support for a large number of MTC or M2M devices, each generating a small amount of data. At cell level in a network, it is expected that each household in a cell may have up to 40 MTC devices with a household density per cell according to the assumptions in Annex A of 3GPP TR 36.888.

Many MTC applications can send or receive small amounts of data, so it is expected that the numbers of "frequent" and "infrequent" small-data devices (e.g., NB-IoT UEs) can increase exponentially, but the data size per device will remain small. Although distinctions between "frequent" and "infrequent" data transmission can be arbitrary and/or situation-dependent, in 3GPP TR 23.724, a "frequent" traffic pattern is generally defined as ranging from a few small data transmissions per hour to multiple small data transmissions per minute. As such, "infrequent" traffic patterns can generally include other less frequent data transmissions. Furthermore, as defined in TR 23.724, "small data" can include single packet transmission (UL or DL), dual packet transmission (e.g., UL with subsequent DL, or vice versa), and multiple packet transmission (one or a few UL and/or one or a few DL, in any combination or order).

It is further assumed that data transfer can happen any time when needed by the application, such that before the transmission of the small data, the MTC device may be attached to or detached from the network. Such characteristics for CIoT UEs using frequent small data transmissions may lead to inefficient use of resources in the 3GPP system and high UE power consumption without use of appropriate optimization.

Accordingly, 3GPP has initiated a "Study on Cellular IoT support and evolution for the 5G System," the outcome of which is being documented in 3GPP TR 23.724. More specifically, the objective is to study how to support identified CIoT/MTC functionalities in the 5G core network (CN) with potential connectivity to Wideband Evolved UTRA (WB-EUTRA or eMTC) and/or Narrowband IoT (NB-IoT), for devices that are capable of communicating with a 5G system (5GS). One of the CIoT/MTC function-alities to be evaluated as part of this study is "Small data transmission," including infrequent small data transmission as well as frequent small data transmission from tracking devices with both Mobile Originated (MO) and Mobile Terminated (MT) use cases.

The architectural requirements set forth in TR 23.724 for the "Small data transmission" scenario include:

Resource efficient system signaling load (especially over the Radio interface).

At least equivalent level of security mechanisms for CIoT in 5G system as in EPS.

Equivalent or reduced level of power consumption for UEs used for CIoT in 5GS system as in EPS.

Minimal Access Stratum changes required for NB-IoT/eMTC UEs to connect to 5GS.

Support for the following small data transmissions: single packet transmission (UL or DL); dual packet transmission (UL with subsequent DL, or DL with subsequent UL); and multiple packet transmission (one or a few UL and/or one or a few DL (in any combination or order)).

Support for delivery of IP data and Unstructured (Non-IP) data.

Support for charging, roaming and policy control.

Support API(s) for infrequent small data transmission and capability exposure to AF.

Furthermore, the architectural baseline assumptions in 23.724 with respect to this scenario include that:

Small data can be exchanged using either the northbound API interface between 5GC and AF or the N6 interface between UPF and AF; and The 5GS network function terminating the northbound API is assumed to support message based charging.

One goal of such a study is to identify solutions for the 5G CN to provide at least equivalent support for the current CIoT/MTC related functionality available in EPS, while taking into account inherent system constraints providing the standards tools so that the Operators that want to migrate to 5G CN to have standardized solutions to provide IoT service via their 5G CN deployment. This goal does not preclude that, due to the different nature of EPC and 5G CN architecture, some features developed for EPS may not be extensible as is to the other, or that performance of a specific feature may differ from one core network architecture to the other.

In LTE, the current data transfer procedures require the use of the Service Request procedure. This involves downloading the RRC security context to the eNB and the establishment of the radio bearers. If all that is intended is the transfer of one, possibly small, IP data packet, from a UE starting in RRC IDLE state, these procedures lead to a substantial increase in radio resource utilisation.

SUMMARY

Accordingly, exemplary embodiments of the present disclosure address these and other shortcomings in CIoT scenarios, thereby facilitating efficient infrequent small data transmissions for at least low complexity, power constrained, and low data-rate CIoT UEs.

Such exemplary embodiments can include methods and/or procedures for transmission of data in a communication system comprising a radio access network (RAN) and a core network (CN). The exemplary method and/or procedure can be performed by a user equipment (e.g., UE, wireless device, CIoT device, MTC device, NB-IoT device, modem, etc. or component thereof) in communication with the CN via the RAN.

The exemplary methods and/or procedures can include sending, to an Access and Mobility Management Function (AMF) in the CN, a request to establish a small-data user-plane (SDUP) data session. The exemplary methods and/or procedures can also include receiving a response indicating that the requested SDUP data session is established. The response can include an identifier associated with a user-plane function (UPF), within the CN, that supports the established SDUP data session. The response can also include an SDUP security configuration for communication between the UE and the CN during the established SDUP data session. The exemplary methods and/or procedures can also include subsequently communicating user data, associated with the established SDUP data session, with the UPF via a serving node in the RAN. In some embodiments, the exemplary methods and/or procedures can also include performing one or more security-related operations, on the user data based on the SDUP security configuration.

Other exemplary embodiments can include methods and/or procedures for supporting communication between a cellular Internet of Things (CIoT) user equipment (UE) and a core network (CN), in accordance with particular exemplary embodiments of the present disclosure. The exemplary methods and/or procedures can be performed by an Access and Mobility Management Function (AMF), in the CN, that is capable of communicating with the UE via a radio access network (RAN).

These exemplary methods and/or procedures can include receiving, from the UE, a request to establish a small-data user-plane (SDUP) data session. In some embodiments, the exemplary methods and/or procedures can include selecting a session management function (SMF) based on support for the SDUP data session. The exemplary methods and/or procedures can also include sending, to the SMF, a session setup request comprising security information for the SDUP data session. The exemplary methods and/or procedures can also include receiving a session setup response from the SMF. The session setup response can include an identifier associated with a user-plane function (UPF), within the CN, that supports the requested SDUP data session. The session setup response can also include an SDUP security configuration for communication between the UE and the CN during the requested SDUP data session.

The exemplary methods and/or procedures can also include sending, to the UE, a response indicating that the requested SDUP data session is established. The response can include the identifier associated with the UPF and the SDUP security configuration. In some embodiments, the exemplary methods and/or procedures can also include subsequently receiving, from the UPF, an indication of availability of downlink data associated with the SDUP data session. In such embodiments, the exemplary methods and/or procedures can also include, in response to the indication, sending a request to page the UE to a radio access network (RAN) serving the UE.

Other exemplary embodiments can include methods and/or procedures for supporting communication between a cellular Internet of Things (CIoT) user equipment (UE) and a core network (CN), in accordance with particular exemplary embodiments of the present disclosure. The exemplary method and/or procedure can be performed by a node (e.g., base station, eNB, gNB, etc., or component thereof) in the RAN that serves the UE and is also capable of communicating with the CN.

The exemplary methods and/or procedures can include receiving a message indicating that data, associated with an established UE small-data user-plane (SDUP) data session, is pending for transmission to, or from, the UE. In some embodiments, the message can comprise a paging request, from the CN, indicating that downlink data is pending for transmission to the UE. In such embodiments, the exemplary methods and/or procedures can include paging the UE in response to the paging request. In other embodiments, the message can comprise a request, from the UE, to establish a connection with the serving node for uplink data pending for transmission from the UE.

The exemplary methods and/or procedures can also include receiving, from the UE, information related to a user-plane function (UPF), of the CN, that is associated with the UE SDUP data session. In some embodiments, the information can be received in response to paging the UE. The exemplary methods and/or procedures can also include, based on the received information related to the UPF, selecting one or more tunnels, between the serving node and the UPF, associated with the SDUP data session. The exemplary methods and/or procedures can also include forwarding the data between the UE and the UPF via the one or more tunnels.

Other exemplary embodiments include user equipment (e.g., CIoT UEs, NB-IoT UEs, MTC UEs, M2M UEs, etc. or components thereof), core network nodes (e.g., AMF of component thereof), and RAN serving nodes (e.g., base station, eNB, gNB, etc., or component thereof) configured and/or arranged to perform the operations of the above-described exemplary methods and/or procedures. Other exemplary embodiments include non-transitory, computer-readable media storing computer-executable instructions that, when executed by processing circuitry comprising a network node or a UE, configure the network node or UE to perform operations corresponding to any of the above-described methods and/or procedures.

These and other exemplary embodiments can provide various advantages, including the ability to send/receive "small data" over the user plane (UP) with minimum and/or reduced signaling overhead as compared to existing solutions. Exemplary advantages also include the ability to reuse existing UP functionality to a very large extent. Exemplary advantages also include avoidance of storing UE context in the radio access network (RAN) when "small data" sessions are established but not active, such that existing IDLE-mode solutions can be employed. These and other advantages can facilitate more timely design, implementation, and deployment of CIoT solutions to support "small data" scenarios in 5G networks.

BRIEF DESCRIPTION OF THE DRAWINGS

FIGS. 16-19 are flow diagrams illustrating various exemplary methods and/or procedures implemented in a communication system, according to various exemplary embodiments of the present disclosure.

DETAILED DESCRIPTION

Figure 1:
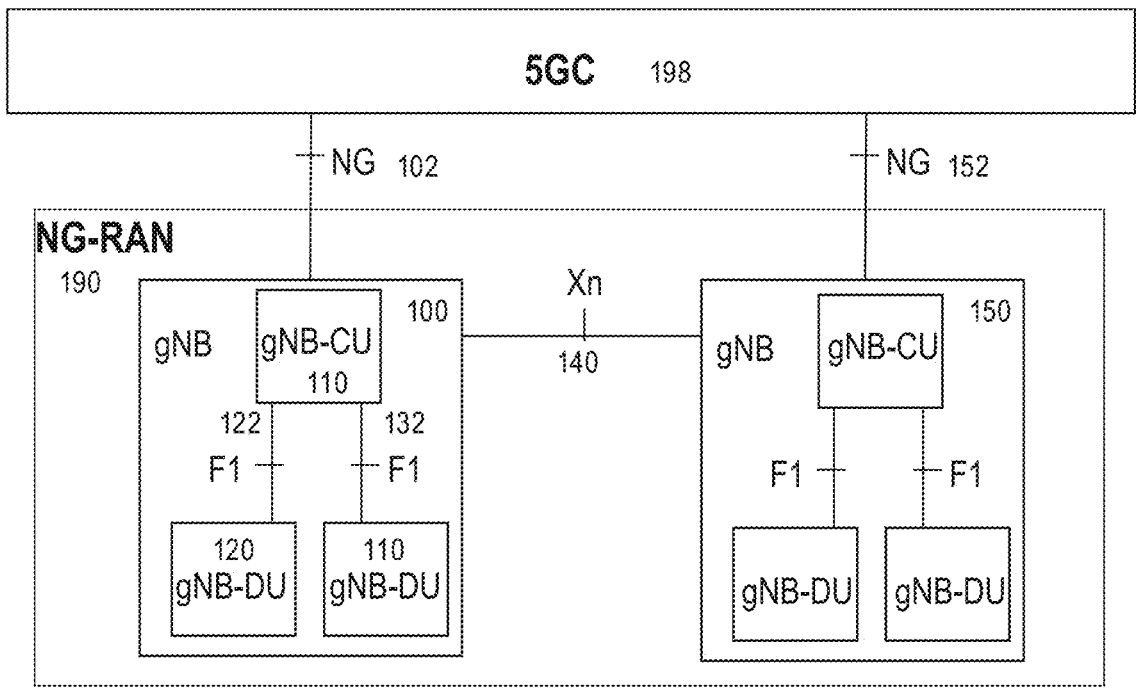
FIGS. 1-2 illustrate two exemplary, high-level views of a 5G network architecture including an NG-RAN and a 5G Core Network (5GC).
Figure 2:
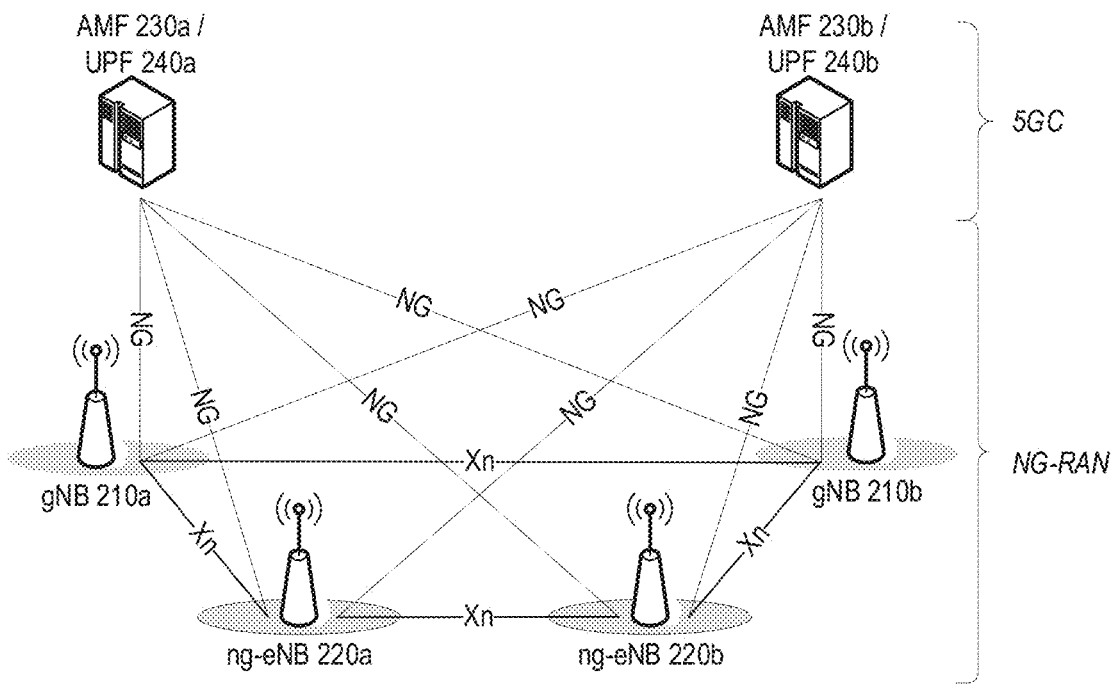
Figure 3:
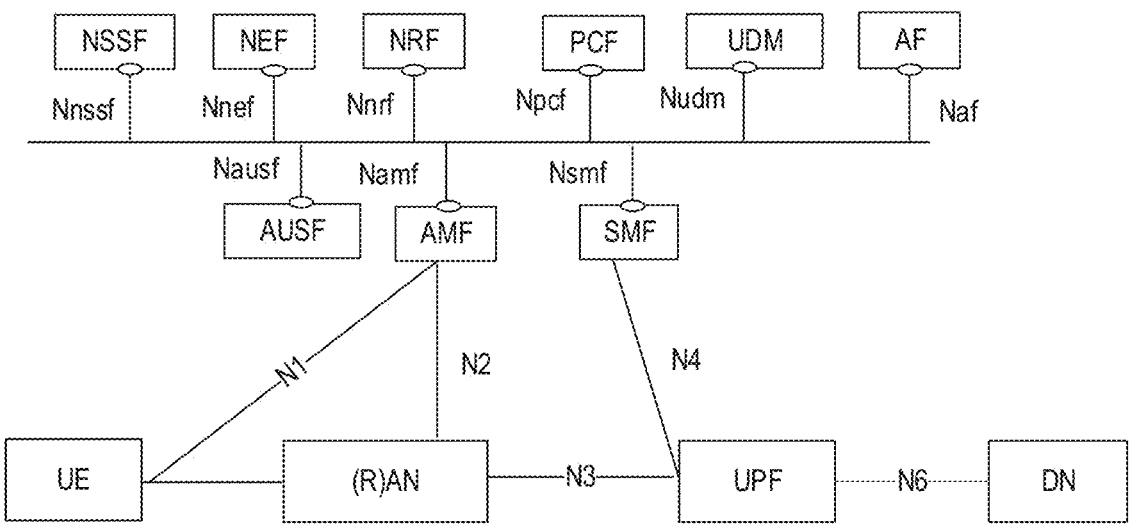
FIG. 3 further illustrates the 5G network architecture from a reference point perspective.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the disclosed embodiments will be apparent from the following description.

As briefly mentioned above, there is a need for improvements for handling of "small data" transmissions—both frequent and infrequent—in 5G networks. Substantial E-UTRAN/EPC evolution has been achieved in 3GPP across multiple Working Groups. In particular, eMTC (WB-E-UTRAN) and NB-IoT have been initially released in Rel-13 and enhanced in Rel-14. The corresponding system architecture aspects have been designed for the EPC for both CIoT (Rel-13) and CIoT extensions (Rel-14). These system architecture aspects apply to both NB-IoT and eMTC (WB-E-UTRAN).

Even though no new radio access technology (RAT) will be defined for 5G mMTC as part of the 5G System introduced in Rel-15, the 5G CN should support 5G mMTC requirements, 5G service requirements for IoT as defined by SA1 in 3GPP TS 22.261, and corresponding RAN 5G mMTC requirements in 3GPP TR 38.913. Furthermore, eMTC/NB-IoT devices are expected to have a long lifespan (>10 years). As such, networks should support such devices throughout their evolution. In addition, operators deploying 5GS may want to consolidate CIoT and all other services on a single 5G CN. So there is a need to study how to support CIoT services in the 5G CN and how to support a smooth migration towards 5G CN also for CIoT.

One technique proposed to address the "frequent small data" scenario is referred to as "user data fast path" (UDFP), "small data fast path" (SDFP), and/or "small data user plane" (SDUP). During 2013, work on optimized user plane for small data was performed in 3GPP SA2 and documented as two separate solutions as published in 3GPP TR 23.887 v12.0.0, specifically section 5.1.1.3.6 entitled "Small Data Fast Path/Connectionless." One of the solutions, "Small data fast path" documented in subclause 5.1.1.3.6.2 as "alternative A", was listed having the following characteristics or attributes:

- Includes security between UE and SGW. Security information is provided by MME to SGW at session creation. The security solution is FFS by SA3.
- The UE passes information required for the eNB to forward the small data to the SGW. The eNB derives the SGW S1-U GPRS Tunneling Protocol (GTP) Fully-Qualified Tunnel Endpoint Identifier (F-TEID) from the SGW Bearer Resource ID provided by the UE. The GTP F-TEID can include an IP address in the SGW, an identifier of an endpoint of a particular tunnel at that IP address (e.g., a TEID), and a generic routing encapsulation (GRE) key associated with the tunnel.
- It operates per bearer and only when a device uses a single bearer. The information appended to the small data specifies the GTP-U tunnel where the eNB forwards the data.
- A bearer can be enabled for small data fast path. If data arriving in the UE or the SGW meets the small data criteria (a 5-tuple and a packet limit not exceeded) it is sent in the fast path, otherwise the data is sent the normal way by initiating a Service Request.
- A suitable RAN transmission mechanism is to be decided together with RAN groups.

The UDFP solution allows for data transmission to go through the "normal" user plane (UP) nodes, making it possible to reuse existing UP functionality for packet delivery, charging, QoS, etc. However, UDFP has a significant impact on the 5G CN (5GC). In particular, UDFP creates specific issues and/or problems related to UL signaling, UL/DL data, UE registration, security context handling, etc. It is desirable, then, to provide an improved technique for supporting "small data" transmissions in CIoT that has a minimal, or at least reduced, impact on the 5GC but provides other exemplary benefits described here.

Exemplary embodiments described herein comprise a mechanism, technique, and/or solution for supporting efficient, small-data transmissions over user plane in 5GC including various novel mechanisms in the UE, RAN, and CN. Such mechanism, technique, and/or solution is referred to herein, in general terms, as "small data fast path," "small data user plane," or SDUP, for short. Exemplary benefits of such embodiments include the ability to send and/or receive small data over the user plane with a minimum and/or reduced signaling overhead. This can be especially beneficial not only for messaging applications but also applications using keep-alive signaling (e.g., M2M and smartphones). Exemplary benefits also include reuse of existing UP functions, e.g., passing data, charging, IP address, IP routing, firewalls/NATs/VPNs, DPI, etc. Exemplary benefits also include avoiding the need for UE context to be stored in the RAN when there is no active SDUP session for the UE. As such, UE can remain in CM-IDLE state and can utilize existing IDLE mechanism (including Mobility).

The disclosed SDUP solution optimizes, facilitates, and/or improves small data transmission for UEs (e.g., CIoT UEs) in CM-IDLE mode. An important aspect of SDUP is based on setting up a special PDU session in 5GC tailored for small data transmission. In this manner, a UE is provided, during PDU session establishment, with information from the SMF about the end-point of the UPF connection and relevant QoS flow(s) to be used for the connection. The UPF information provided to the UE during SDUP session establishment can include one or more of the following:

UPF address (e.g., IPv4 or IPv6, TEID, L2 address).
Index pointing at a specific UPF, such that the RAN can translate the index to UPF.
UPF ID, possible separated into different parts (e.g., UPF group ID, UPF instance ID within the group).
Random identifier which the RAN maps to a UPF ID or UP address.

In some embodiments, the UPF information that the UE receives could be UE specific, e.g., pointing at a specific UE context in the UPF. In other embodiments, multiple UEs could share the same UPF information. In the latter embodiments, the UE communicating with the UPF can provide additional UE-specific information, e.g., using RRC signaling, as part of a User Data packet (including header).

In some embodiments, when the UE communicates with the network, the UE can append the UPF and/or QoS flow information to small data that is sent uplink (UL) to the RAN. As stated above, the information could be part of the UP data packet or sent separately using RRC, PDCP, RLC, MAC, or NAS signaling or related/associated information and/or signaling. The UP data packet can also include security information used to verify that the packet is from the correct UE and that it has not been manipulated. The security information can be a secure checksum (e.g., Message Authentication Code) calculated using a security key available in the UE and in the 5GC/UPF. The UP packet can also contain an Sequence Number or nonce (i.e., number used once) to be used as part of the secure checksum calculation and its verification in the receiver. In this manner, the UE provides information required for the RAN to forward the small data to the UPF, and the RAN derives the UPF information from the information provided by the UE.

The RAN uses the provided information and passes the small data packet via N3 to the UPF. The UPF can verify the received packet using a security context setup during PDU session establishment and forwards it as normal. The security information can be configured by NAS during UE registration or PDU session setup. Verification can include checking that the secure checksum is correct and/or that the identifiers used in the packet or sent from the RAN matches the stored UE context. As such, UP security is between UE and UPF.

To allow subsequent DL small data, the RAN node can transfer the DL RAN GTP F-TEIDs to the UPF node so that subsequent DL data can be sent to the RAN node. SDUP can also support DL data using CN paging, e.g., by configuring DRX parameters, etc., during UE registration. SDUP can also support UE Power Saving Mode (PSM), if defined.

Furthermore, one or more QoS flows can be enabled for SDUP. For example, a UE can indicate QoS information for a packet over the radio interface, and the RAN can forward the QoS information for verification by the UPF, e.g., that the UE is authorized to use a certain QoS flow.

The SDUP solution can also facilitate storing the UE context only in the SMF and rebuilding the UPF context on demand. As such, the UPF node can contact the SMF when it receives a packet for an unknown UE context. The SMF can then provide the UE context information (including security context to the UPF).

Furthermore, the SDUP solution is intended as an add-on function handled in a separate PDU session. As such, it does not replace any existing system function, but can be used if both the network and UE support it. Accordingly, this reduces system impact and simplifies the introduction and support of infrequent small data scenarios—via SDUP—in Low Power Wide Area Networks (LPWAN).

Figure 4:
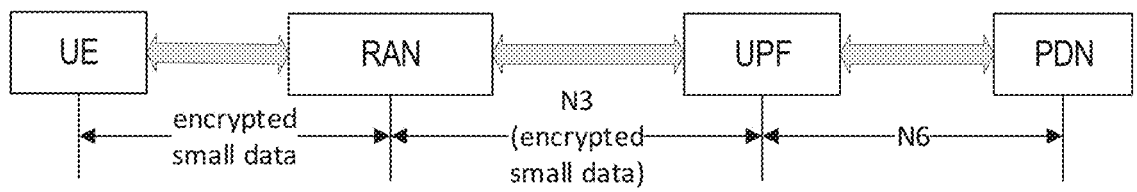
FIG. 4 is a block diagram illustrating end-to-end (E2E) small-data user-plane (SDUP) transmission in a 5G network.

FIG. 4 is a block diagram illustrating end-to-end (E2E) SDUP transmission in a 5GS. Although not shown in the diagram, SDUP can be facilitated by the session management function (SMF) providing relevant UPF- and/or PDU session-related information to the UE, e.g., during session management (SM) procedures. The UPF- and/or PDU session-related information can include a particular UPF GTP F-TEID and one or more QoS flows associated with the SDUP session. The UPF- and/or PDU session-related information can also include any other information that is necessary and/or useful for identifying the UE context in the UPF. The UPF- and/or PDU session-related information can also include security-related information that could enable the UE to integrity protect and/or cipher data to the UPF.

The UE subsequently sends this information to the RAN, which enables the RAN to derive the path over N3 to the UPF. Subsequently, when UL data arrives at the UE, it sends the data to the RAN along with information identifying the associated SDUP data session. The RAN then forwards the data via the N3 path to the UPF GTP F-TEID that it previously identified as being associated with the UE's SDUP data session. Since all info required to forward the data is received from the UE, the RAN does not need to signal to the AMF or store any UE context information. The UPF subsequently delivers the data over the N6 interface to the packet data network (PDN).

Also not shown in FIG. 4, the AMF can derive small-data security information and provide it to the SMF. The SMF can store the security information for the PDU session, enable indicated QoS flows, and acknowledge to the AMF that they have been SDUP-enabled.

Figure 5:
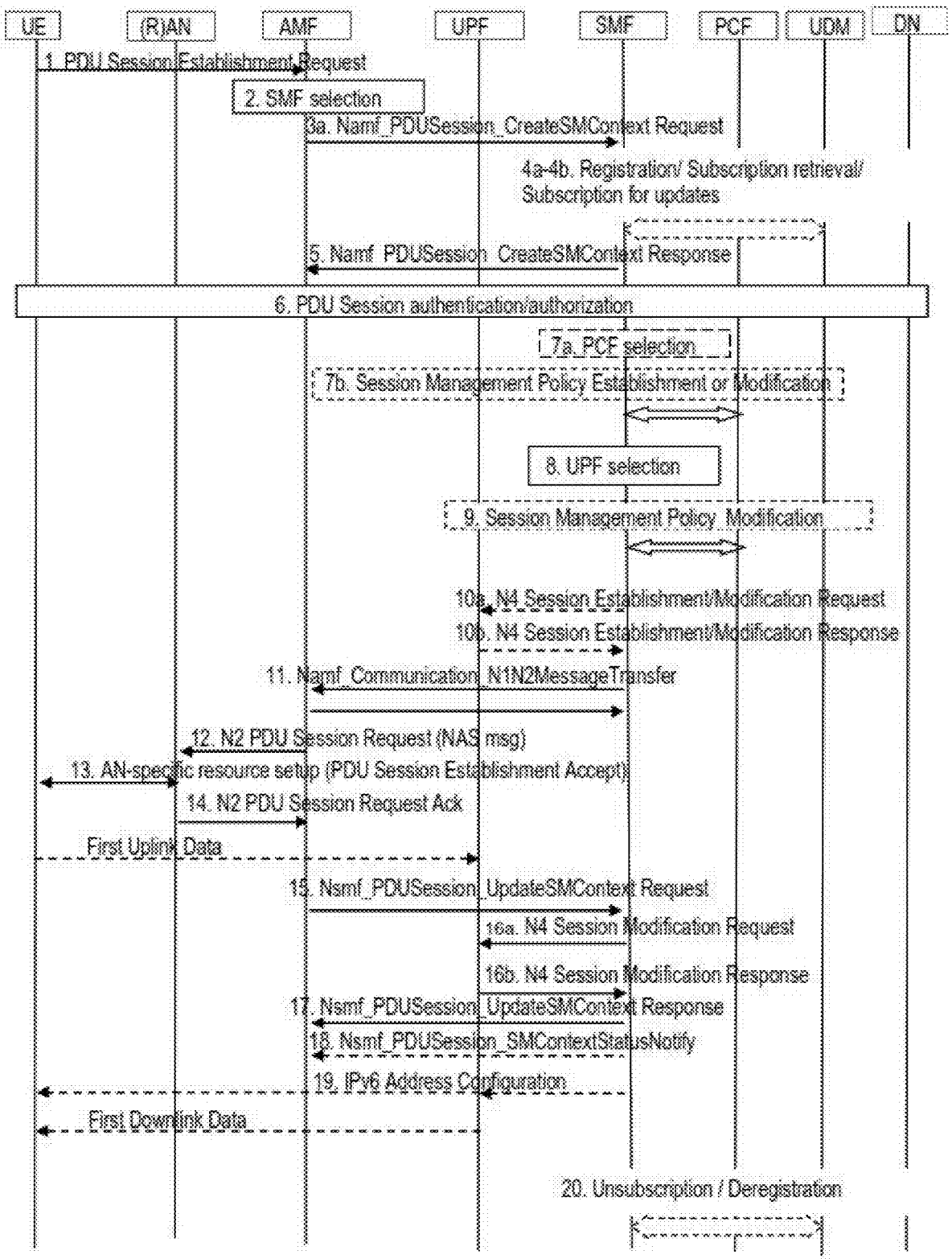
FIG. 5 is a flow diagram illustrating a UE-requested PDU Session Establishment based on SDUP, according to exemplary embodiments of the present disclosure.

FIG. 5 is a flow diagram illustrating a UE-requested PDU Session Establishment based on SDUP, according to exemplary embodiments of the present disclosure. The operations shown in the figure are based on the assumption that the UE has already registered with the AMF. In the figure and the following description, various operations are given numerical labels or designations. However, this is for convenience only and should not be interpreted as limiting the operations to occur in any particular numerical order. In addition, the description below focuses on modifications to the existing PDU session establishment to accommodate SDUP. As such, detailed descriptions of operations not substantially affected or modified may be omitted from, or minimized in, the description.

In operation #1, the UE can provide an indication it wants to establish a SDUP data session to the AMF via the RAN. Additionally, the UE can also provide NSSAI indicating a specific network slice for SDUP. The NSSAI can be used, e.g., by the RAN to select an AMF that supports SDUP. In operation #2, the AMF uses the received information to select an SMF that supports SDUP. After such selection, in operation #3, the AMF can generate an SDUP security context and/or configuration for the UE, which it then forwards to the selected SMF. For example, the SDUP security context and/or configuration can include information about security algorithms and/or security keys to be used for ciphering and/or encryption. It could also include some counters (or similar) to be used for keeping track of which key versions, in case there is a mechanism to refresh the keys.

In operation #5, the AMF receives a response, from the SMF, pertaining to the message sent in operation #3. In operation #8, the SMF selects a UPF to support SDUP according to the request from the UE via the AMF. In operation #10, the SMF can perform an N4 Session Establishment procedure including setting up the SDUP security context in the UPF. During this procedure, the UE UPF- and PDU session-related information discussed above can be generated. In operation #11, the SMF can send this generated information in an N1 session management (SM) message to the AMF. Operations #12-14 involve PDU session setup between the AMF and the UE in response to the UE's request in operation #1. In this manner, the UE can receive an identifier associated with the UPF that supports the SDUP data session (selected in operation #8), as well as the security configuration to be used for communicating with the 5GC during the SDUP data session (generated in operation #3). The first uplink data for the SDUP data session being sent from UE to UPF after operation #14.

Figure 6:
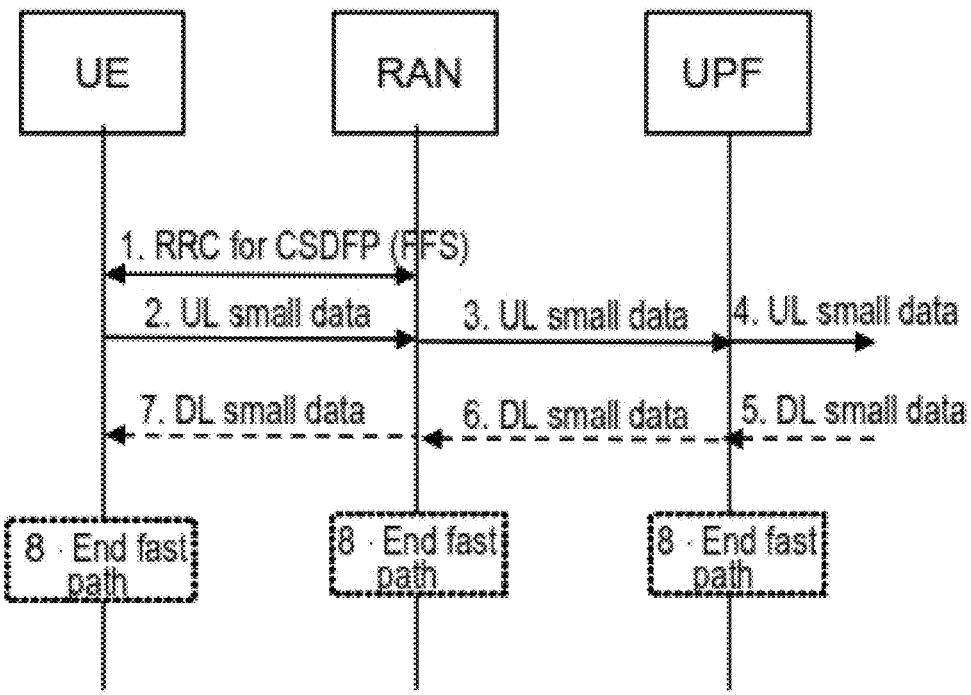
FIG. 6 is a flow diagram illustrating a mobile-originated (MO) SDUP data transfer initiated by arrival of UL data at the UE, according to exemplary embodiments of the present disclosure.

FIG. 6 is a flow diagram illustrating a mobile-originated (MO) SDUP data transfer initiated by arrival of UL data at the UE, according to exemplary embodiments of the present disclosure. The operations shown in the figure are based on the assumption that the UE has complete the operations described above with respect to FIG. 5, such that the UE has received UPF and PDU session information. In the figure and the following description, various operations are given numerical labels or designations. However, this is for convenience only and should not be interpreted as limiting the operations to occur in any particular numerical order.

In operation #1, the UE can establish an RRC connection for transfer of UL data associated with the SDUP data session. This can involve various existing idle-mode RRC connection setup operations, such as transmission of random access request/response, etc. Parameters for selection of UPF for the SDUP session are sent from the UE to the RAN as part of an RRC message (in operation #1) or as part of user data (e.g., in operation #2 described below). These parameters can comprise and/or be based on a UPF identifier received earlier (e.g., in the operations shown in FIG. 5).

Such parameters for UPF selection can include any of the following: UPF address (e.g., IPv4 or IPv6 address, TEID, L2 address); index pointing at a specific UPF, that can be used by the RAN to translate the index to UPF; UPF ID, possibly separated into different parts (e.g.,UPF group ID, UPF instance ID within the group, etc.); and a random identifier that the RAN can map to a UPF ID or UP address. The parameters can be used in the RAN to identify the UPF to forward uplink packets associated with the SDUP data session to the identified UPF. These parameters can also be used to select a UE-specific destination GTP F-TEID in the UPF, or alternatively a common GTP TEID for all UEs with a context in that UPF. In case of a common GTP TEID, a later-transmitted UL data packet (operation #2, below) can include a UE context identifier that the UPF could later use to identify the UE context.

In operation #2, the UE transmits the uplink data to the RAN, possibly after encrypting and/or integrity-protecting the data. These operations can be based on the UE's SDUP security configuration received earlier (e.g., in the operations shown in FIG. 5). In operation #3, the RAN forwards the UL data to the UPF identified early, using the UPF's GTP F-TEID and/or QoS flows associated with the SDUP data session. The RAN can also provide the UPF with RAN's GTP F-TEID information for the SDUP session, which enables the UPF to send DL data associated with the SDUP data session to the RAN. In operation #4, the UPF can check the received UL data PDU's integrity and decrypt it. If the PDU passes these checks, the UPF can forward the UL data on the N6/N9 interface.

In addition, the UPF can enable subsequent DL data transmissions to the RAN node from which it received the UL data PDU, using the RAN's GTP F-TEID provided, e.g., in operation #3. For example, in operation #5, a DL packet for the UE may arrive on the N6/N9 interface at the UPF. This data packet can be, e.g., an acknowledgement (ACK) of the UL data PDU sent during operation #4. In operation #6, the UPF encrypts and/or integrity-protects the DL data PDU and transmits it to the RAN node as enabled by operations #3-4. In operation #7, the RAN forwards the received DL data to the UE. In operation #8, the SDUP information contexts are released in UE and RAN, and DL data transmission to the UE is set in disabled state in the UPF. This can be performed in at least the following ways.

First, different timers (e.g., inactivity timers) can be used in the UE, RAN, and UPF. The timers can be started after a packet has been sent or received. When the timer times out the context of the ongoing SDUP session can be released. The timers values can be specified in a standard or configured by a network node towards the UE, e.g., using NAS or RRC signaling.

Alternately, an (inactivity) timer can be used in the RAN node and/or UPF. When the timer times out the RAN node can send a message to the UE to release the connection and go back into sleep state, meaning to stop monitoring scheduling channel for DL data packets. In case the timer is in the UPF the UPF can send an indication to the RAN node when the timer times our, triggering the RAN node to release connection towards the UE.

Figure 7:
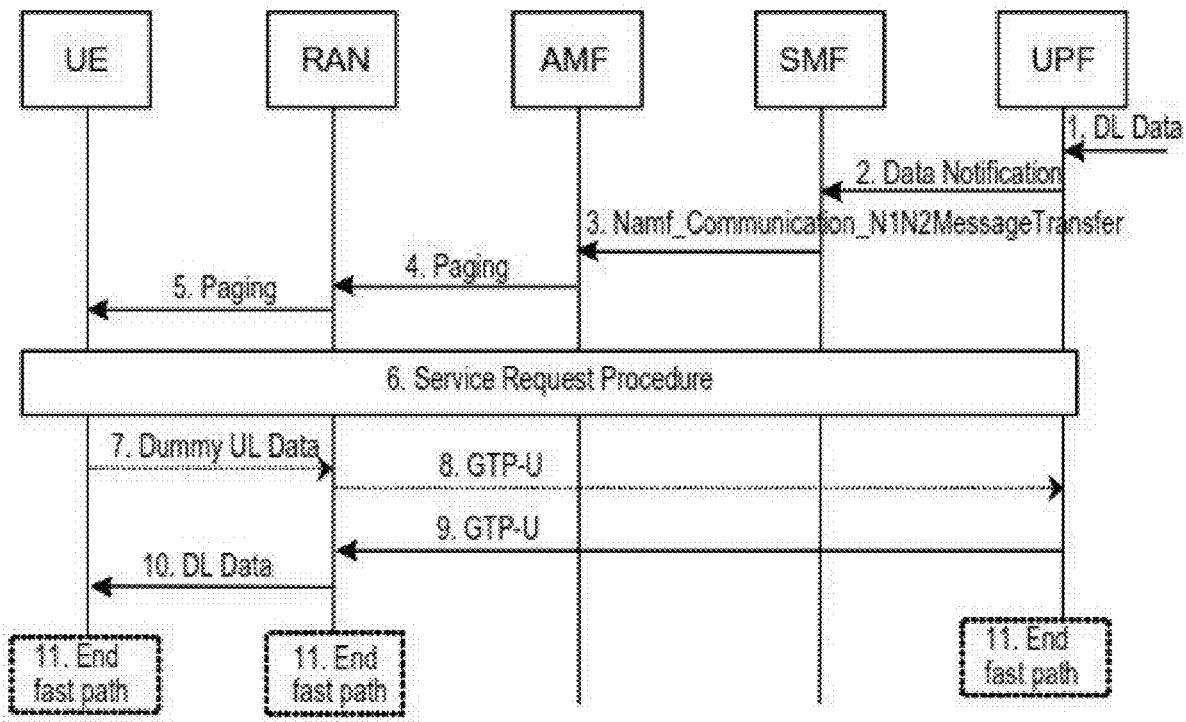
FIG. 7 is a flow diagram illustrating a mobile-terminated (MT) SDUP data transfer initiated by arrival of DL data at the UPF, according to exemplary embodiments of the present disclosure.

FIG. 7 is a flow diagram illustrating a mobile-terminated (MT) SDUP data transfer initiated by arrival of DL data at the UPF, according to exemplary embodiments of the present disclosure. The operations shown in the figure are based on the assumption that a fast path (e.g., SDUP data session) is enabled (e.g., via operations shown in FIG. 5) but it is not active (e.g, RAN GTP F-TEID is unknown). Compared to UL-initiated small data transfer shown in FIG. 6, the DL-initiated transfer shown in FIG. 7 requires an additional paging of the UE. In the figure and the following description, various operations are given numerical labels or designations. However, this is for convenience only and should not be interpreted as limiting the operations to occur in any particular numerical order.

In operation #1, DL data associated with the UE's previously-established SDUP data session arrives at the UPF. In response, a network-initiated service request procedure can be used to reach the UE. For example, in operation #2, the UPF can send a Data Notification message to the SMF indicating the availability of the DL data associated for the UE. In operation #3, the SMF informs the AMF of the availability of the DL data by sending a Namf_Communication_N1N2MessageTransfer message, which can include an identity of the UE and an indicator that the data is associated with the SDUP data session.

In operation #4, the AMF sends a paging request message to the RAN where the UE is located. In operation #5, the RAN (e.g., the UE's serving node in the RAN) sends a paging message (also referred to as a "page") to the UE. The paging message can include an indication that it is related to downlink data associated with the UE's established SDUP data session, as discussed further below.

Before the UPF can send the DL data to the UE, however, it must use a tunnel to deliver the DL data to the RAN, which can then forward the received DL data via the tunnel to the UE. Such a tunnel can be identified by a GPRS Tunneling Protocol (GTP) Fully-Qualified Tunnel Endpoint Identifier (F-TEID). A RAN GTP F-TEID can include an IP address in the RAN, an identifier of an endpoint of a particular tunnel at that IP address, and a generic routing encapsulation (GRE) key associated with the tunnel.

Two options can be considered for providing the UPF with the RAN GTP F-TEID: A) the F-TEID is carried from the RAN as part of a Service Request procedure towards the UPF (operation #6 in FIG. 7); and/or B) as part of a Dummy UL data procedure (operations #7-10 in FIG. 7). The two options can be used individually or in combination.

In option A the RAN could have functionality to identify that the UE performing the Service Request is performing this request in relation to SDUP. This be achieved by the UE indicating in the RRC layer when performing the Service Request that it is SDUP related. The indication could for instance be carried by an RRC Connection Setup or RRC Connection Setup Complete message. When the RAN receives the information, the RAN could generate or allocate a RAN GTP F-TEID associated with this UE connection.

It also may not be possible to avoid having an indication from the UE and instead always allocate a GTP F-TEID in the RAN. The GTP F-TEID could be provided to the AMF over the N2 (NG-C) interface together with the NAS Service Request generated bu the UE. The AMF can forward the TEID to the SMF who forwards it to the UPF. When the UPF receives the GTP F-TEID it can send the DL packet to the RAN.

In option B, the UE can generate a dummy UL packet in response to receiving the paging message (in operation #5) and send this towards the RAN (in operation #7). The UL packet and related signaling can be handled as normal UL data in the manner shown and described above in relation to FIG. 6. In the same manner as for normal UL data, the RAN will provide the UPF with the DL RAN GTP F-TEID (operation #8). In order for the UE to know that it is being paged for SDUP traffic, the AMF can include an SDUP indication in the page message (operation #4), which the RAN then sends towards the UE (operation #5). The AMF can include the SDUP indication based on information that data has arrived for an SDUP session (e.g., as informed by the SMF in operation #2). When the UE receives this indication, it can trigger the dummy UL packet (operation #7). When UPF receives the dummy packet, it can discard it and not forward it to other interfaces (except possibly to SMF, as needed).

In some embodiments, the UPF can notify the AMF (e.g., via SMF) to stop paging attempts. This can be done when paging is no longer needed or useful, e.g., because UE has already responded with (or otherwise sent) UP data to the UPF, or because the DL data and/or other reason for paging is no longer relevant (e.g., because of time out/expired time to live/delay budget).

As an alternative to option B, instead of sending an SDUP data session indication together with the page message, the UE can be paged using a special UE identity which is associated with the SDUP connection. When the UE sees this identity in the paging message, it could trigger a dummy UL packet and/or service request in the manner discussed above. As an example, the special UE identity could be assigned to the UE as part of the PDU session establishment.

In the exemplary procedures shown in FIG. 7, the operation(s) of ending the SDUP connection could be the same as described above with respect to FIG. 6.

In various embodiments, idle-mode mobility can be supported for SDUP-capable UEs as for conventional UEs. When the UE enters a new tracking area (TA) currently not part of the UE registration area, it will initiate a UE registration update. During the UE registration update, UPF information and/or PDU session information could be updated towards the UE by the SMF, e.g., if the UE context is relocated to a new UPF. For example, the SMF can fetch the UE context from the UPF, and/or the AMF can fetch the UE context from SMF/UPF. The fetched UE context can then be forwarded to the target nodes. The UE context could include the security context or other information.

In various embodiments, as part of the UE context relocation, the UE security context can be refreshed using mechanisms discussed herein. The SN sequence number could also be reset. Furthermore, the UE sends SDUP session traffic without having set up the regular AS security. In various embodiments, the security protection can be done by security contexts in the UE and the AMF/SMF/UPF. These are established as part of existing signaling, hence keeping the signaling overhead for small data to a minimum. The security context or related information can be appended to the signaling messages between AMF, SMF and UPF, as well as towards the UE. The security context could include the following:

Session keys, which could be different for different flows, bearers, PDU sessions. For example, separate keys could also be used for ciphering/deciphering and for integrity protection/verification.

Sequence numbers (SN) or counters (e.g., incremented with every packet) could be used as input to the ciphering/deciphering and for integrity protection/verification algorithms to ensure that each packet will be ciphering or integrity protected in a different way.

UE security capabilities indicating, e.g., which algorithms the UE support.

Other counters keeping track of Key Sets being used or how many times a new key has been derived from an old key (e.g., Next Hop Chaining Counter (NCC)), or indicating/providing/ensuring freshness (e.g., SQN, DL or UL NAS COUNT), e.g., using a pseudo random Key Derivation Functions (as for example specified in 3GPP).

In various embodiments, the security information for the SDUP can be stored in the SMF, UPF, and UE as part of the PDU Session Resource Request information. The security information can be retained as long as the fast path remains enabled, regardless of whether the fast path is currently active. When the security information is updated for the UE, the AMF can update the SMF with new security information for small data transfer. The security protocols between the UE and the UPF can be similar to E-UTRA PDCP-layer protocols that reuse the integrity protection and ciphering functionality.

One particular issue is the need to refresh the UE security context at certain intervals or events. Refreshing the security context can include changing the session keys, or possible deriving new security keys form the old security context. It can also include changing the input to the encryption or integrity protection algorithm and this way ensure that the output of that algorithm is fresh (not repeating the same output as before). Typical events where it could be beneficial, desirable, and/or necessary to refresh the security context include:

- Mobility events such as when the UE move to a new Tracking Area or UE registration area.
- When the UE context need to be relocated to a new node (e.g., new AMF, or SMF, or UPF).
- When the Sequence Number used to count the packets sent is about to wrap around (e.g., when SN is $32^n-1$ it will transition to 0). In this case the context should be refreshed to prevent that the same SN which could be used as input to the ciphering or integrity protection is used twice with the same key which is bad for security.
- Based on timers, e.g., every hour or other time period(s).
- Re-keying, e.g., after the UE has performed new Authentication and Key Agreement (AKA) procedure.

The trigger for security context refresh based on the example below could come from any network node (AMF, SMF, UPF, PCF, etc.) or from the UE. UE-initiated triggers can include a NAS message sent from UE to the network to request security context refresh, the UE tearing down an existing SDUP data session and performing another SDUP data session establishment, and/or the UE modifying the existing SDUP data session.

Various network-initiated triggers for security context refresh can also exist. For example, the network can perform a UE re-authentication to refresh the master session key which will trigger refresh of the keys used for the SDUP data session. The network can also perform an SDUP-specific key refresh procedure including signaling towards the UE. The security context refresh procedure can also be performed as part of AMF, SMF, and/or UPF relocation procedure. The network-initiated security context refresh can also be part of other NAS procedure(s), e.g., registration/TAU or service request.

A security context refresh can be based on, and/or include exchange of, one or more security context parameters/information including, e.g., key indicator, key derivation indicator, counter, key derivation counter, next hop chaining counter, and nonce. When the security context (e.g., when new keys are generated) is refreshed it is possible to reset the sequence number counter in the UE and the UPF.

Figure 8:
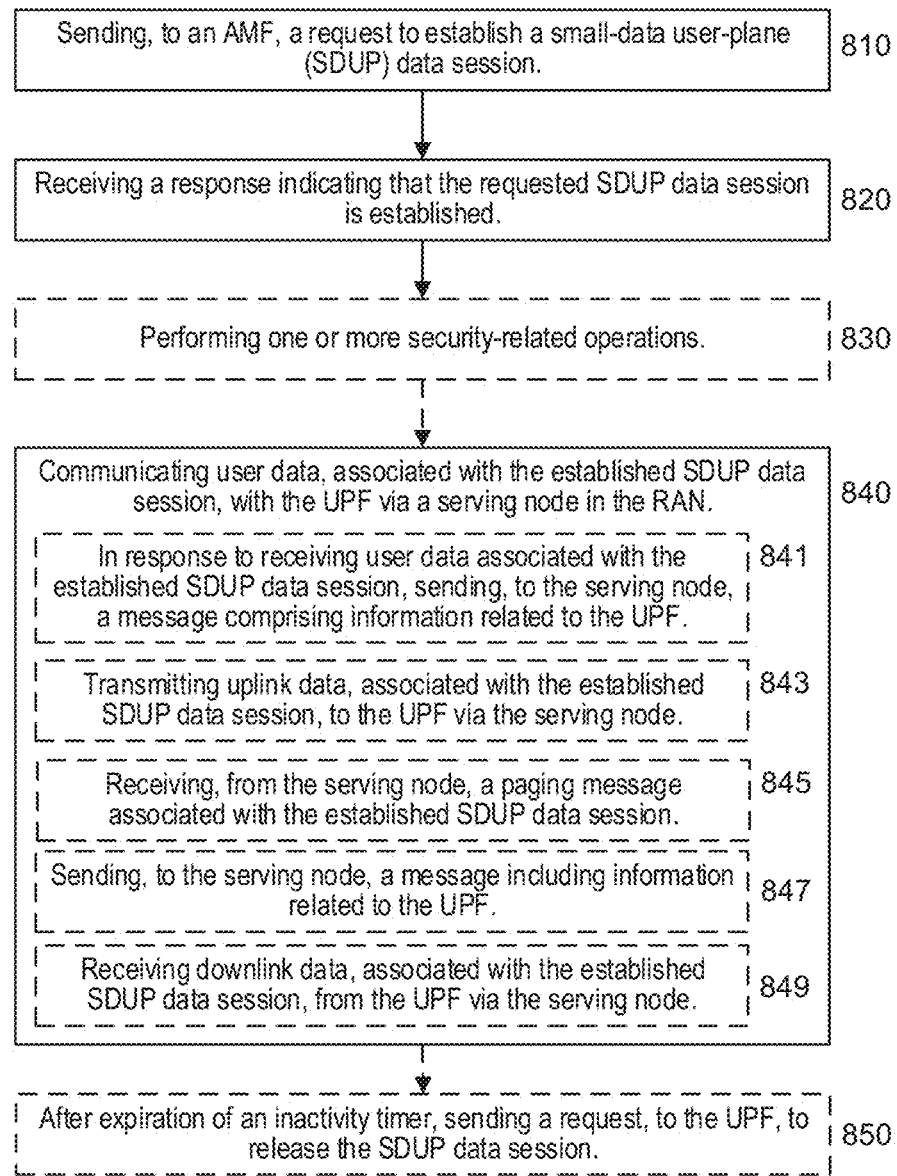
FIG. 8 is a flow diagram illustrating exemplary methods and/or procedures performed by a user equipment (e.g., UE, wireless device, MTC device, NB-IoT device, modem, etc. or component thereof), according to various exemplary embodiments of the present disclosure

FIG. 8 illustrates an exemplary method and/or procedure for transmission of data in a communication system comprising a radio access network (RAN) and a core network (CN), in accordance with particular exemplary embodiments of the present disclosure. The exemplary method and/or procedure can be performed by a user equipment (e.g., UE, wireless device, CIoT device, MTC device, NB-IoT device, modem, etc. or component thereof) in communication with the CN via the RAN. For example, the exemplary method and/or procedure shown in FIG. 8 can be implemented, for example, in a UE or device configured according to other figures described herein.

Figure 9:
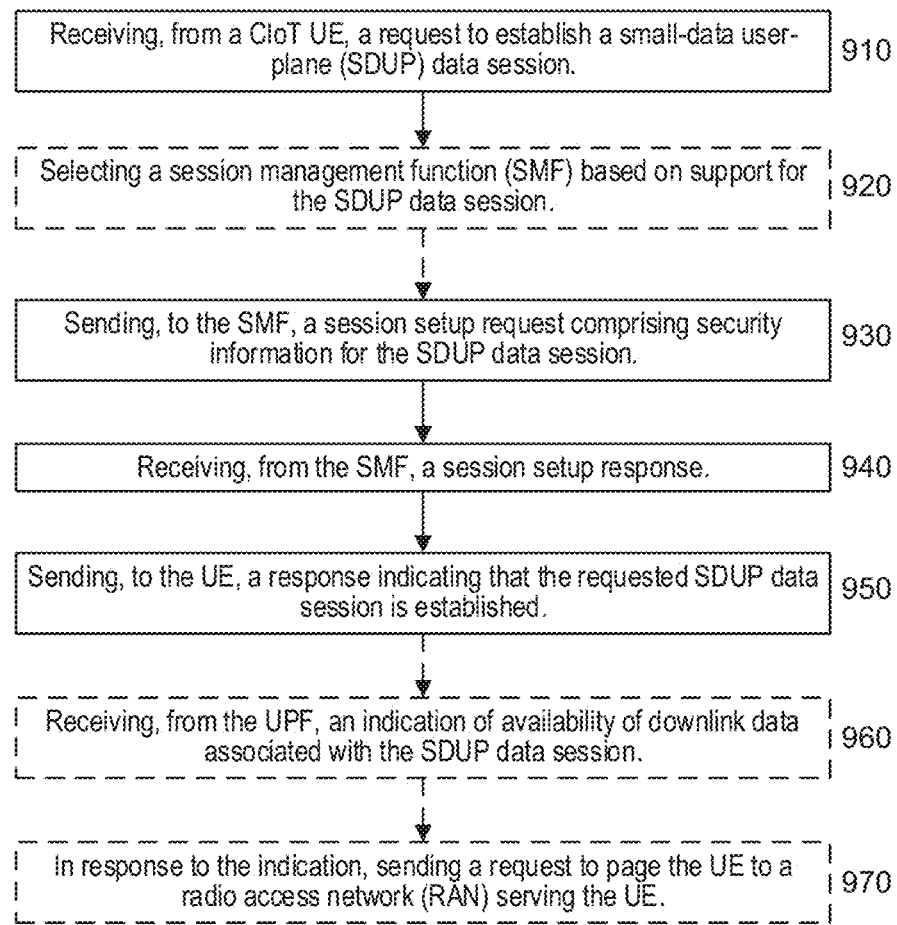
FIG. 9 is a flow diagram illustrating exemplary methods and/or procedures performed by an Access and Mobility Management Function (AMF), according to various exemplary embodiments of the present disclosure
Figure 10:
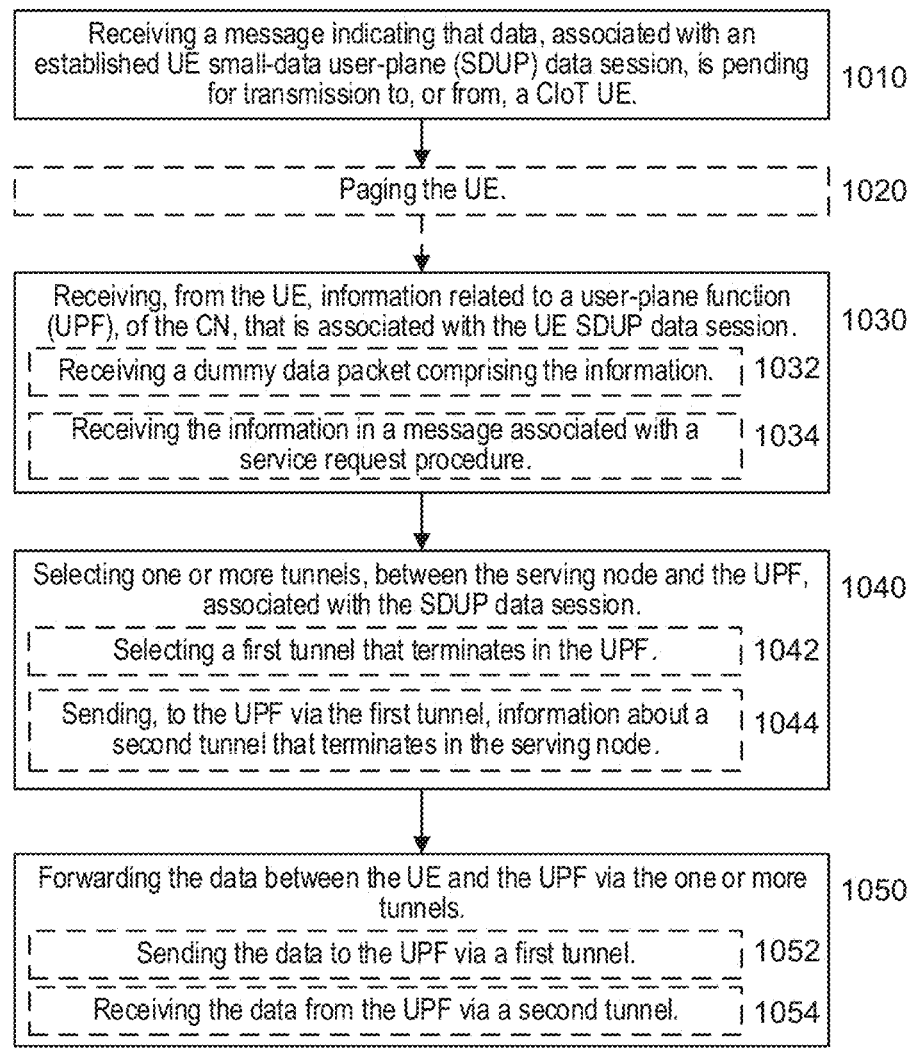
FIG. 10 is a flow diagram illustrating exemplary methods and/or procedures performed by a network node (e.g., base station, eNB, gNB, etc., or component thereof), according to various exemplary embodiments of the present disclosure.

Although the exemplary method and/or procedure is illustrated in FIG. 8 by blocks in a particular order, this order is exemplary and the operations corresponding to the blocks can be performed in different orders, and can be combined and/or divided into blocks having different functionality than shown in FIG. 8. Furthermore, exemplary method and/or procedure shown in FIG. 8 can be complementary to exemplary methods and/or procedures illustrated in FIGS. 9 and 10 below. In other words, exemplary methods and/or procedures shown in FIGS. 8-10 are capable of being used cooperatively to provide the benefits, advantages, and/or solutions to problems described hereinabove. Optional blocks and/or operations are indicated by dashed lines.

The exemplary method and/or procedure can include the operations of block 810, where the UE can send, to an Access and Mobility Management Function (AMF) in the CN, a request to establish a small-data user-plane (SDUP) data session. The exemplary method and/or procedure can also include the operations of block 820, where the UE can receive a response indicating that the requested SDUP data session is established. The response can include an identifier associated with a user-plane function (UPF, e.g., a UPF within and/or associated with the CN) that supports the established SDUP data session. The response can also include an SDUP security configuration for communication between the UE and the CN during the established SDUP data session. The exemplary method and/or procedure can also include the operations of block 840, where the UE can subsequently communicate user data, associated with the established SDUP data session, with the UPF via a serving node in the RAN.

In some embodiments, the request to establish the SDUP data session can be a PDU Session Establishment Request message, and the response can be a PDU Session Request message. In some embodiments, the request to establish the SDUP data session can also include an identifier of a network slice, of the communication network, that supports SDUP data sessions.

In some embodiments, the operations of block 840 can also include the operations of blocks 841 and 843. In block 841, the UE can, in response to receiving user data associated with the established SDUP data session, send to the serving node a message comprising information related to the UPF. Such information can comprise and/or be based on the identifier associated with the UPF that was received in operation 820. In block 843, the UE can transmit uplink data, associated with the established SDUP data session, to the UPF via the serving node. In some embodiments, the information related to the UPF can be transmitted together with the uplink data.

In other embodiments, the operations of block 840 can also include the operations of blocks 845, 847, and 849. In block 845, the UE can receive, from the serving node, a paging message associated with the established SDUP data session. In some embodiments, the paging message can include one or more of the following: an indication that the paging message is related to downlink data associated with the established SDUP data session; and a UE identity associated with the established SDUP data session. In some embodiments, the UE identity can be assigned in the response received in operation 820, described above. In such case, including the same UE identity in the paging message can also be used to indicate that the paging message is associated with the SDUP data session. In block 847, the UE can send to the serving node, in response to the paging message, a message including information related to the UPF. In various embodiments, the message including information related to the UPF can be a dummy uplink data packet or part of a UE service request procedure towards the CN. In block 849, the UE can receive downlink data, associated with the established SDUP data session, from the UPF via the serving node.

In some embodiments, the exemplary method and/or procedure can also include the operations of block 830, where the UE can perform one or more security-related operations based on the SDUP security configuration. In various embodiments, these operations in block 830 can be performed before or after the communicating operations in block 840. In some embodiments, prior to transmitting the uplink data, the UE can encrypt the uplink data and/or append integrity-protection information to the uplink data. In other embodiments, after receiving the downlink data, the UE can decrypt the received downlink data and/or integrity-check the received downlink data.

In some embodiments, the exemplary method and/or procedure can also include the operations of block 850, where the UE can, after expiration of an inactivity timer following communicating the user data, send to the UPF a request to release the SDUP data session.

FIG. 9 below illustrates an exemplary method and/or procedure for supporting communication between a cellular Internet of Things (CIoT) user equipment (UE) and a core network (CN), in accordance with particular exemplary embodiments of the present disclosure. The exemplary method and/or procedure can be performed by an Access and Mobility Management Function (AMF), in the CN, that is capable of communicating with the UE via a radio access network (RAN). For example, the exemplary method and/or procedure shown in FIG. 10 can be implemented, for example, in a serving node configured according to other figures described herein.

Although the exemplary method and/or procedure is illustrated in FIG. 9 by blocks in a particular order, this order is exemplary and the operations corresponding to the blocks can be performed in different orders, and can be combined and/or divided into blocks having different functionality than shown in FIG. 9. Furthermore, exemplary method and/or procedure shown in FIG. 9 can be complimentary to exemplary method and/or procedure illustrated in FIG. 8 above and FIG. 10 below. In other words, exemplary methods and/or procedures shown in FIGS. 8-10 are capable of being used cooperatively to provide the benefits, advantages, and/or solutions to problems described hereinabove. Optional blocks and/or operations are indicated by dashed lines.

The exemplary method and/or procedure can include the operations of block 910, where the AMF can receive, from the UE, a request to establish a small-data user-plane (SDUP) data session. In some embodiments, the exemplary method and/or procedure can include the operations of block 920, where the AMF can select a session management function (SMF) based on support for the SDUP data session. The exemplary method and/or procedure can also include the operations of block 930, where the AMF can send, to the SMF, a session setup request comprising security information for the SDUP data session.

The exemplary method and/or procedure can also include the operations of block 940, where the AMF can receive a session setup response from the SMF. The session setup response can include an identifier associated with a user-plane function (UPF), within the CN, that supports the requested SDUP data session. The session setup response can also include an SDUP security configuration for communication between the UE and the CN during the requested SDUP data session.

The exemplary method and/or procedure can also include the operations of block 950, where the AMF can send, to the UE, a response indicating that the requested SDUP data session is established. The response can include the identifier associated with the UPF and the SDUP security configuration, e.g., received in block 940. In some embodiments, the request from the UE (e.g., in block 910) can be a PDU Session Establishment Request message, and the response to the UE can be a PDU Session Request message.

In some embodiments, the exemplary method and/or procedure can also include the operations of block 960, where the AMF can subsequently receive, from the UPF, an indication of availability of downlink data associated with the SDUP data session. In such embodiments, the exemplary method and/or procedure can also include the operations of block 970, where the AMF can, in response to the indication, send a request to page the UE to a radio access network (RAN) serving the UE.

FIG. 10 below illustrates an exemplary method and/or procedure for supporting communication between a cellular Internet of Things (CIoT) user equipment (UE) and a core network (CN), in accordance with particular exemplary embodiments of the present disclosure. The exemplary method and/or procedure can be performed by a node (e.g., base station, eNB, gNB, etc., or component thereof) in the RAN that serves the UE and is also capable of communicating with the CN. For example, the exemplary method and/or procedure shown in FIG. 10 can be implemented, for example, in a serving node configured according to other figures described herein.

Although the exemplary method and/or procedure is illustrated in FIG. 10 by blocks in a particular order, this order is exemplary and the operations corresponding to the blocks can be performed in different orders, and can be combined and/or divided into blocks having different functionality than shown in FIG. 10. Furthermore, exemplary method and/or procedure shown in FIG. 10 can be complimentary to exemplary method and/or procedure illustrated in FIGS. 8 and 9 above. In other words, exemplary methods and/or procedures shown in FIGS. 8, 9, and 10 are capable of being used cooperatively to provide the benefits, advantages, and/or solutions to problems described hereinabove. Optional blocks and/or operations are indicated by dashed lines.

The exemplary method and/or procedure can include the operations of block 1010, where the serving node can receive a message indicating that data, associated with an established UE small-data user-plane (SDUP) data session, is pending for transmission to, or from, the UE. In some embodiments, the message can comprise a paging request, from the CN, indicating that downlink data is pending for transmission to the UE. In such embodiments, the exemplary method and/or procedure can include the operations of block 1020, where the serving node can page the UE in response to the paging request. In other embodiments, the message can comprise a request, from the UE, to establish a connection with the serving node for uplink data pending for transmission from the UE.

The exemplary method and/or procedure can include the operations of block 1030, where the serving node can receive, from the UE, information related to a user-plane function (UPF), of the CN, that is associated with the UE SDUP data session. In embodiments that include the operations of block 1020, the information received in block 1030 can be in response to paging the UE in block 1020. In some embodiments, the operations of block 1030 can include the operations of sub-block 1032, where the serving node can receive a dummy uplink data packet comprising the information. In other embodiments, the operations of block 1030 can include the operations of sub-block 1034, where the serving node can receive the information in a message associated with a service request procedure.

The exemplary method and/or procedure can include the operations of block 1040, where the serving node can, based on the received information related to the UPF, select one or more tunnels, between the serving node and the UPF, associated with the SDUP data session. In some embodiments, the operations of block 1040 can include the operations of sub-block 1042, where the serving node can select a first tunnel that terminates in the UPF. In some embodiments, the operations of block 1040 can also include the operations of sub-block 1044, where the serving node can send, to the UPF via the first tunnel, information about a second tunnel that terminates in the serving node.

The exemplary method and/or procedure can include the operations of block 1050, where the serving node can forward the data between the UE and the UPF via the one or more tunnels. In some embodiments, the operations of block 1050 can include the operations of sub-block 1052, where the serving node can send the data to the UPF via the first tunnel (e.g., selected in sub-block 1042). In some embodiments, the operations of block 1050 can include the operations of sub-block 1054, where the serving node can receive the data from the UPF via the second tunnel (e.g., identified in sub-block 1044).

In various embodiments, the information related to the UPF (e.g., received in block 1030) can be one or more of the following: an IP address associated with the UPF; a Layer-2 (L2) address associated with the UPF; a UE-specific GPRS Tunneling Protocol (GTP) fully-qualified Tunnel Endpoint Identifier (F-TEID) associated with the UPF; a Group GTP F-TEID associated with the UPF; a UPF index; a multi-part UPF identifier; and a random identifier associated with the UPF.

Figure 11:
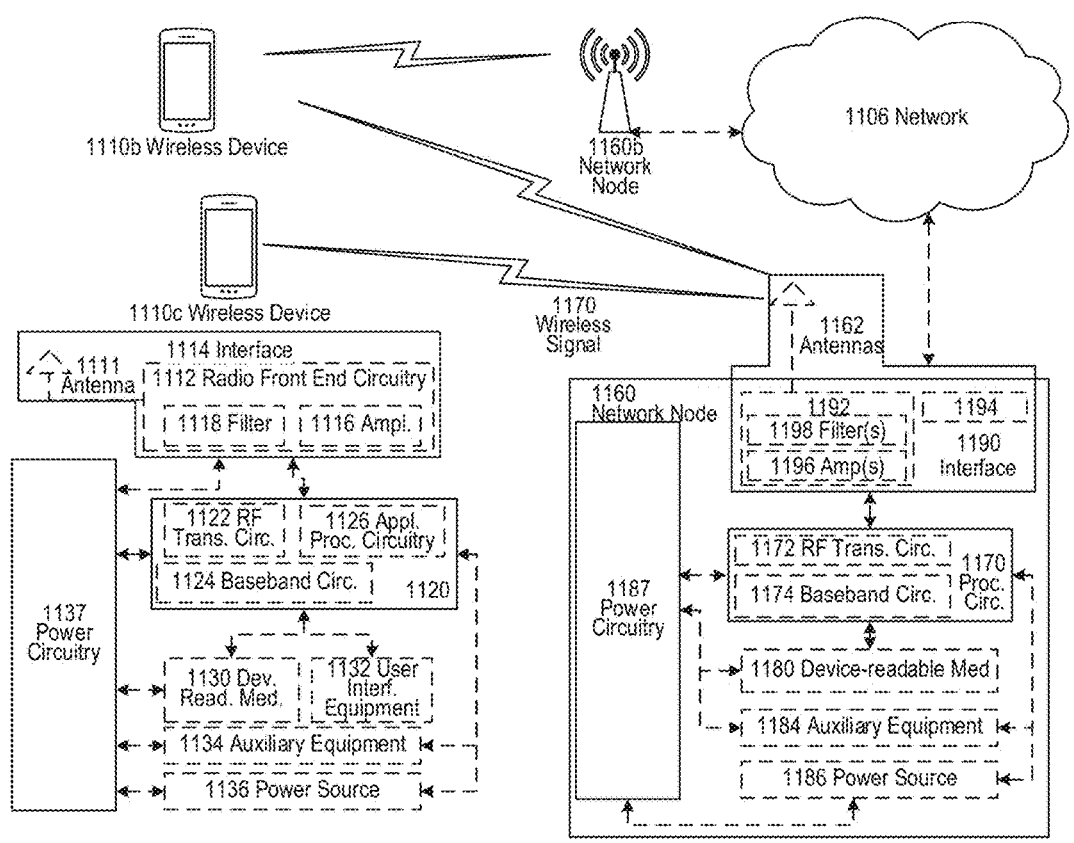
FIG. 11 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and a RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 can execute instructions stored in device readable medium 1180 or in memory within processing circuitry 1170. Such functionality can include providing any of the various wireless features, functions, or benefits discussed herein. In some embodiments, processing circuitry 1170 can include a system on a chip (SOC).

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality can include providing any of the various wireless features or benefits discussed herein. For example, processing circuitry 1120 can execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110, and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network, and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
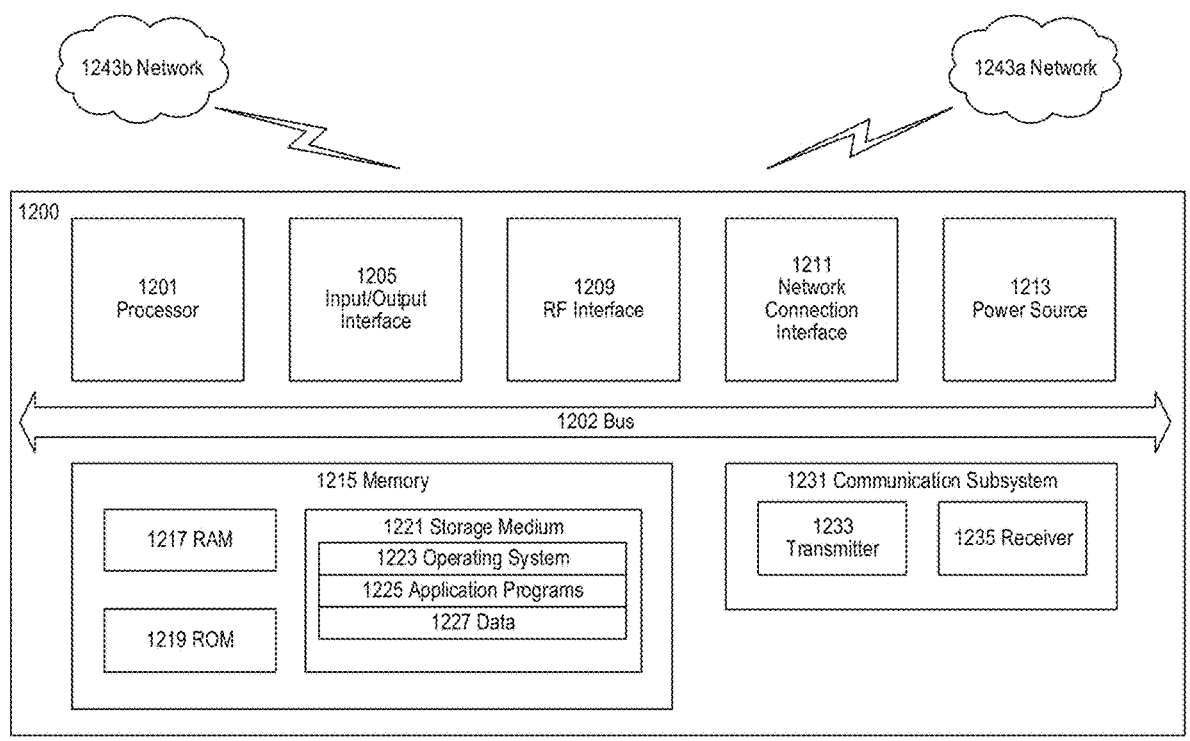
FIG. 12 illustrates an exemplary embodiment of a UE, in accordance with various aspects described herein.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 can be configured to include operating system 1223, application program 1225 such as a web browser application, a widget or gadget engine or another application, and data file 1227. Storage medium 1221 can store, for use by UE 1200, any of a variety of various operating systems or combinations of operating systems.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243b can encompass wired and/or wireless networks such as a local-area network (LAN), a wide-area network (WAN), a computer network, a wireless network, a telecommunications network, another like network or any combination thereof. For example, network 1243b can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
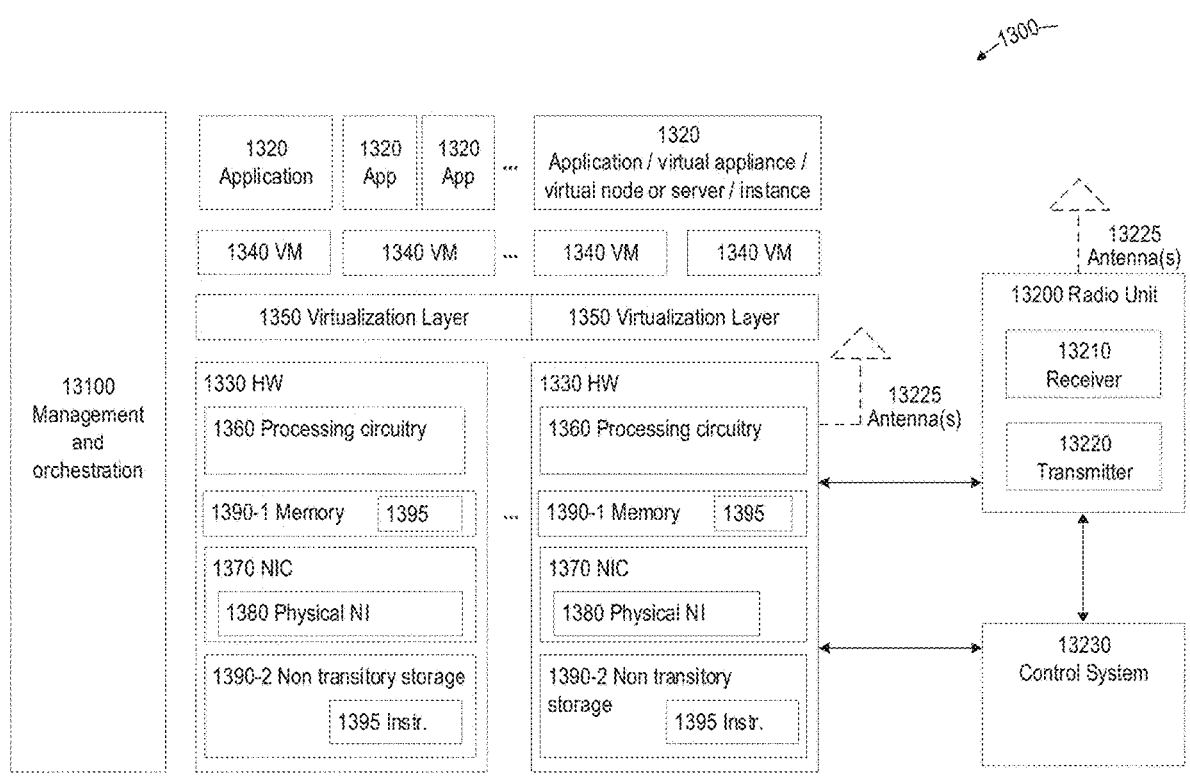
FIG. 13 is a block diagram illustrating an exemplary virtualization environment usable for implementation of various embodiments of network nodes described herein.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station.

In some embodiments, some signaling can be effected with the use of control system 13230 which can alternatively be used for communication between the hardware nodes 1330 and radio units 13200.

Figure 14:
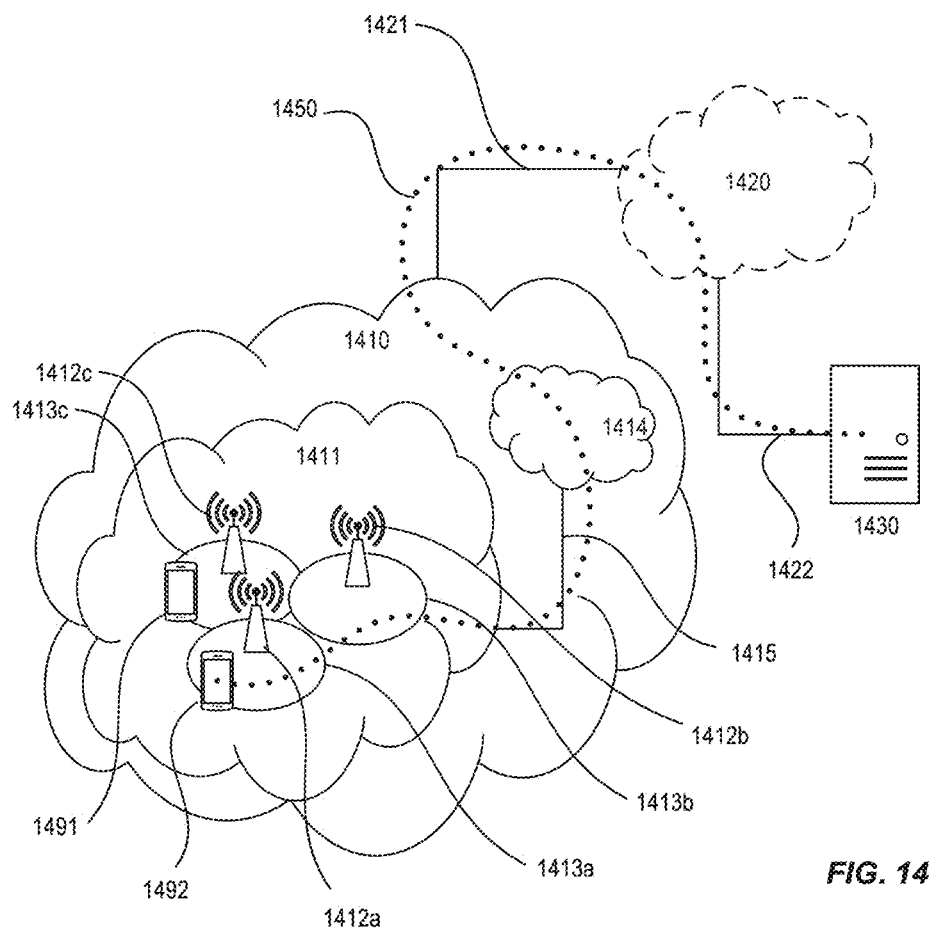
FIGS. 14-15 are block diagrams of various exemplary communication systems and/or networks, in accordance with various aspects described herein.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider, or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 can also include UE 1530 already referred to. Its hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides.

Figure 15:
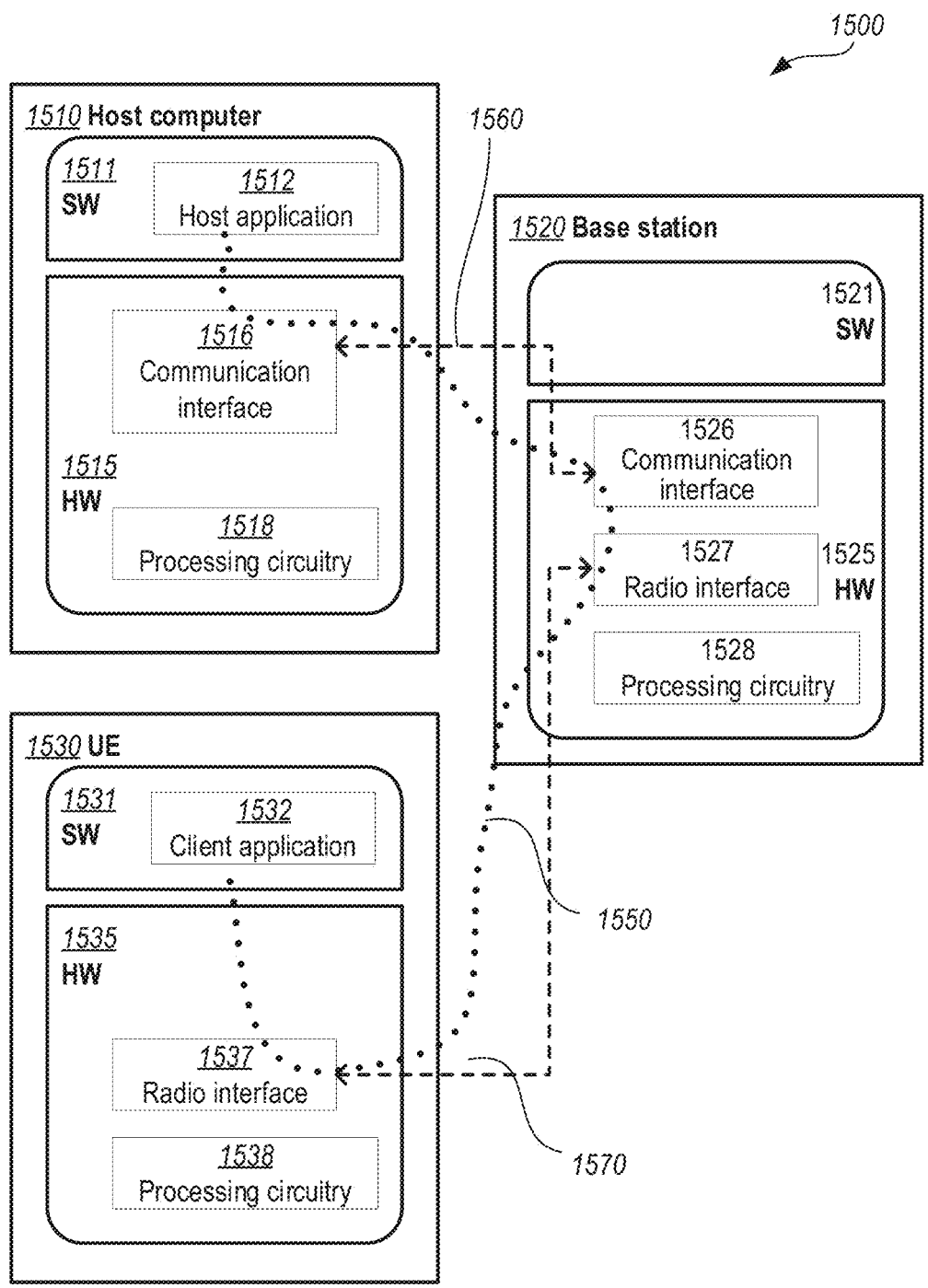

It is noted that host computer 1510, base station 1520 and UE 1530 illustrated in FIG. 15 can be similar or identical to host computer 1430, one of base stations 1412a, 1412b, 1412c and one of UEs 1491, 1492 of FIG. 14, respectively. This is to say, the inner workings of these entities can be as shown in FIG. 15 and independently, the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacitiy, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors etc.

FIG. 16 is a flowchart illustrating an exemplary method and/or procedure implemented in a communication system, in accordance with one embodiment. The communication system includes a host computer, a base station and a UE which, in some exemplary embodiments, can be those described with reference to FIGS. 14 and 15. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

Figures 18, 19:
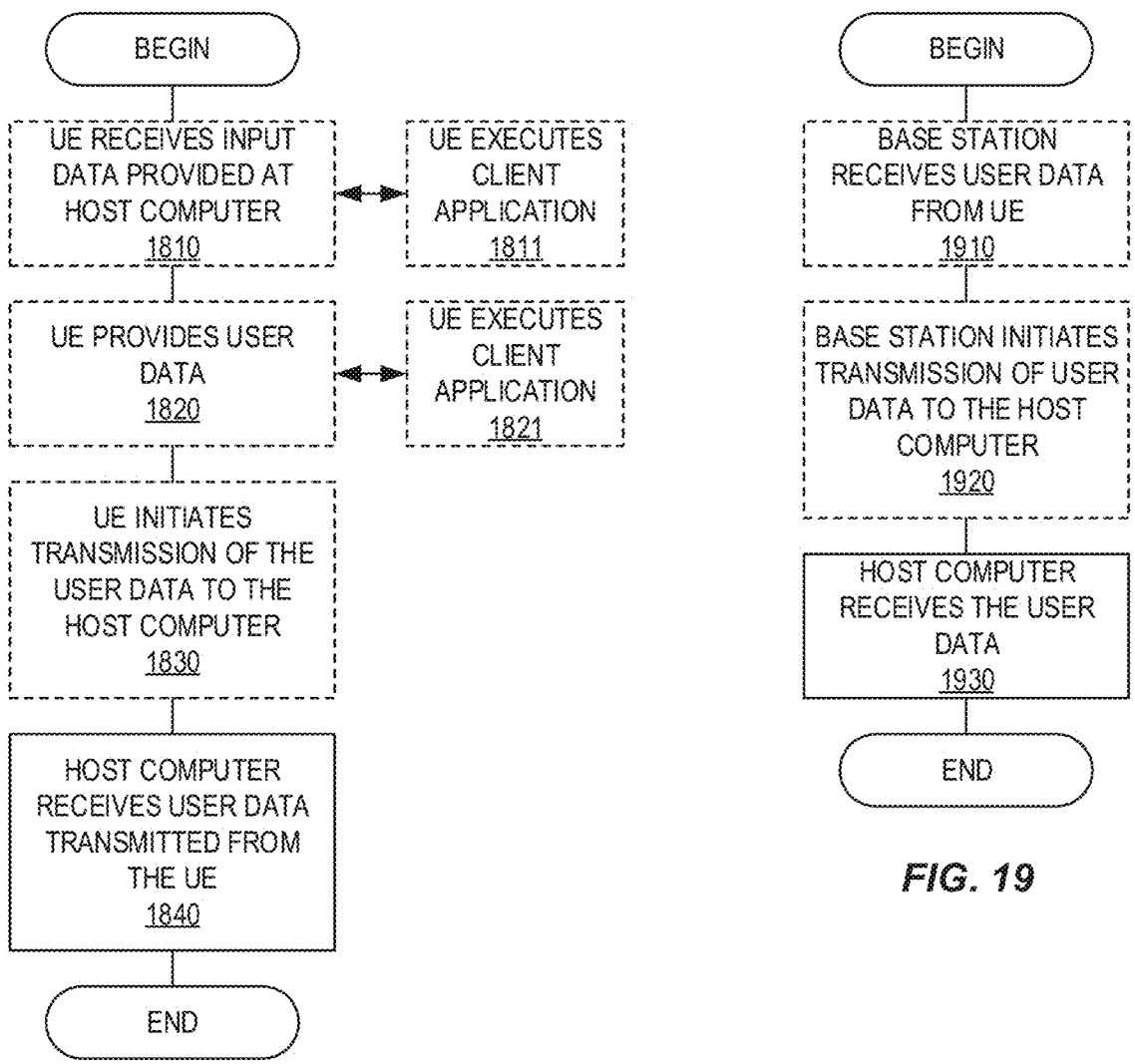

FIG. 18 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In addition to various embodiments described above, exemplary embodiments of the present disclosure include the following enumerated embodiments.

1. A method performed by a cellular Internet of Things (CIoT) user equipment (UE) for transmission of data in a communication system comprising a radio access network (RAN) and a core network (CN), the method comprising:
    sending, to an Access and Mobility Management Function (AMF) comprising the CN, a PDU Session Establishment Request message for establishing a small-data user-plane (SDUP) data session;
    receiving, from the AMF, a PDU Session Request message comprising: an identification of a user plane function (UPF), within the CN, that supports the SDUP data session; and an SDUP security context between the UE and the identified UPF;
    in response to receiving uplink data to be transmitted, sending, to a serving node in the RAN, a message comprising the UPF identification; and
    transmitting the uplink data to the UPF via the serving node.

2. The method of embodiment 1, further comprising encrypting the uplink data based on the SDUP security context between the UE and the identified UPF.

3. A method performed by an Access and Mobility Management Function (AMF), in a core network (CN), for supporting communication between a cellular Internet of Things (CIoT) user equipment (UE) and the core network (CN), the method comprising:
    receiving, from the UE, a PDU Session Establishment Request message for establishing a small-data user-plane (SDUP) data session;
    selecting a session management function (SMF), within the CN, that supports the requested SDUP data session;
    generating an SDUP security context for the UE and forwarding the SDUP security context to the SMF;
    receiving, from the SMF, an identification of a user plane function (UPF), within the CN, that supports the SDUP data session, and an SDUP security context between the UE and the identified UPF; and
    sending, to the UE, a PDU Session Request message comprising the identification of the UPF and the SDUP security context between the UE and the identified UPF.

4. A method performed by a serving node in a radio access network (RAN) for supporting communication between a cellular Internet of Things (CIoT) user equipment (UE) and a core network (CN), the method comprising:
    receiving, from the UE, a data transfer request comprising an identification of a user plane function (UPF), within the CN, that supports an established small-data user-plane (SDUP) data session with the UE;
    receiving, from the UE, uplink data comprising the SDUP data session; and
    sending the received uplink data to the UPF identified in the data transfer request.

5. A cellular Internet of Things (CIoT) user equipment (UE) comprising:
    processing circuitry configured to perform operations corresponding to any of the methods of embodiments 1-2; and
    power supply circuitry configured to supply power to the user equipment.

6. An Access and Mobility Management Function (AMF), in a core network (CN), for supporting communication between a cellular Internet of Things (CIoT) user equipment (UE) and the core network (CN), comprising:
    processing circuitry configured to perform operations corresponding to the method of embodiment 3; and
    power supply circuitry configured to supply power to the second network node.

7. A serving node in a radio access network (RAN) for supporting communication between a cellular Internet of Things (CIoT) user equipment (UE) and a core network (CN), comprising:
    processing circuitry configured to perform operations corresponding to the method of embodiment 4;
    power supply circuitry configured to supply power to the core network node.

8. A communication system including a host computer comprising:
    processing circuitry configured to provide user data; and
    a communication interface configured to forward the user data to a cellular network for transmission to a user equipment (UE),
    wherein the cellular network comprises:
        i. a serving radio network node having a radio interface and processing circuitry, and
        ii. a core network comprising processing circuitry configured to perform an Access and Mobility Management Function (AMF);
    the a serving radio network node's processing circuitry is configured to perform operations corresponding to the method of embodiment 4; and
    the core network's processing circuitry is configured to perform operations corresponding to the method of embodiment 3.

9. The communication system of embodiment 8, further including a user equipment (UE) configured to communicate with the serving radio network node and the AMF.

10. The communication system of any of embodiments 8-9, wherein:
    the processing circuitry of the host computer is configured to execute a host application, thereby providing the user data; and
    the UE comprises processing circuitry configured to execute a client application associated with the host application.

11. A method implemented in a communication system including a host computer, first and second network nodes, and a user equipment (UE), the method comprising:
    at the host computer, providing user data;
    at the host computer, initiating a transmission carrying the user data to the UE via a cellular network comprising first and second network nodes;
    operations, performed by a serving radio network node, corresponding to the method of embodiment 4; and
    operations, performed by a core network comprising an Access and Mobility Management Function (AMF), corresponding to any of the methods of embodiment 3.

12. The method of embodiment 11, further comprising, transmitting the user data by the serving radio network node.

13. The method of any of embodiments 11-12, wherein the user data is provided at the host computer by executing a host application, the method further comprising, at the UE, executing a client application associated with the host application.

The invention claimed is:

1. A method performed by a cellular Internet of Things (CIoT) user equipment (UE) for transmission of data in a communication network that includes a radio access network (RAN) and a core network (CN), the method comprising:
sending, to an Access and Mobility Management Function (AMF), a request to establish a small-data user-plane (SDUP) data session;
receiving, from the AMF, a response indicating that the requested SDUP data session is established, wherein the response comprises:
an identifier associated with a user-plane function (UPF), within the CN, that supports the established SDUP data session; and
an SDUP security configuration for communication between the UE and the CN during the established SDUP data session, wherein the SDUP security configuration comprises one or more of: session keys, sequence numbers, UE security capabilities that indicates algorithms that is supported by the UE, counters and nonce; and
subsequently communicating user data, associated with the established SDUP data session, with the UPF via a serving node in the RAN, wherein communicating the user data with the UPF comprises:
sending, to the serving node, a message comprising information related to the UPF, wherein the information related to UPF comprises one or more of: an IP address associated with the UPF, a Layer-2 (L2) address associated with the UPF, a UE-specific GPRS Tunneling Protocol (GTP) fully-qualified Tunnel Endpoint Identifier (F-TEID) associated with the UPF, a Group GTP F-TEID associated with the UPF, a UPF index, a multi-part UPF identifier, and a random identifier associated with the UPF;
performing one or more of the following based on the SDUP security configuration: encrypting uplink data, and appending integrity-protection information to the uplink data; and
transmitting the uplink data, associated with the established SDUP data session, to the UPF via the serving node.

2. The method of claim 1, wherein the information related to the UPF is transmitted together with the uplink data.

3. The method of claim 1, wherein communicating the user data with the UPF comprises:
receiving, from the serving node, a paging message associated with the established SDUP data session;
sending, to the serving node in response to the paging message, a message including information related to the UPF; and
receiving downlink data, associated with the established SDUP data session, from the UPF via the serving node.

4. The method of claim 3, wherein the message including the information related to the UPF is one of the following:
a dummy uplink data packet; and
part of a UE service request procedure towards the CN.

5. The method of claim 3, wherein the paging message includes one or more of the following:
an indication that the paging message is related to downlink data associated with the established SDUP data session; and
a UE identity associated with the established SDUP data session.

6. The method of claim 5, wherein the response further comprises an assignment of the UE identity associated with the established SDUP data session.

7. The method of claim 3, further comprising performing one or more of the following operations based on the SDUP security configuration: decrypting the received downlink data, and integrity-checking the received downlink data.

8. The method of claim 1, wherein the request to establish the SDUP data session further includes an identifier of a network slice, of the communication network, that supports SDUP data sessions.

9. The method of claim 1, further comprising, after expiration of an inactivity timer following communicating the user data, sending a request, to the UPF, to release the SDUP data session.

10. A method performed by an Access and Mobility Management Function (AMF) for supporting communication between a cellular Internet of Things (CIoT) user equipment (UE) and a core network (CN), the method comprising:
receiving, from the UE, a request to establish a small-data user-plane (SDUP) data session;
generating a SDUP security configuration for the UE in response to the request;
sending, to a session management function (SMF), a session setup request comprising the SDUP security configuration, the SDUP security configuration comprising information about security algorithms and/or security keys to be used for ciphering and/or encryption of communications with the UE;
receiving, from the SMF, a session setup response comprising:
an identifier associated with a user-plane function (UPF), within the CN, that supports the requested SDUP data session; and
an SDUP security configuration for communication between the UE and the CN during the requested SDUP data session, wherein the SDUP security configuration comprises one or more of: session keys, sequence numbers, UE security capabilities that indicates algorithms that is supported by the UE, counters and nonce;
sending, to the UE, a response indicating that the requested SDUP data session is established, wherein the response comprises the identifier associated with the UPF and the SDUP security configuration;
subsequently receiving, from the UPF, an indication of availability of downlink data associated with the SDUP data session; and
in response to the indication, sending a request to page the UE to a radio access network (RAN) serving the UE.

11. The method of claim 10, further comprising selecting the SMF based on support for the SDUP data session.

12. The method of claim 10, wherein:
the request from the UE is a PDU Session Establishment Request message, and
the response to the UE is a PDU Session Request message.

13. A user equipment arranged to communicate with a core network (CN) via a radio access network (RAN), the user equipment comprising:
transceiver circuitry configured to communicate with a serving network node; and
processing circuitry operably coupled to the transceiver circuitry, wherein the processing circuitry and the transceiver circuitry are configured to perform operations corresponding to the method of claim 1.

14. A non-transitory, computer readable medium storing computer-executable instructions that, when executed by at least one processor of a user equipment arranged to communicate with a core network (CN) via a radio access network (RAN), configure the user equipment to perform operations corresponding to the method of claim 1.

15. An Access and Mobility Management Function (AMF) arranged to support communication between a cellular Internet of Things (CIoT) user equipment (UE) and a core network (CN), the AMF comprising:
   processing circuitry; and
   non-transitory, machine-readable storage medium having stored therein instructions that, when executed by the processing circuitry, configured the AMF to perform operations corresponding to the method of claim 10.

16. A non-transitory, machine-readable storage medium storing computer-executable instructions that, when executed by at least one processor of an Access and Mobility Management Function (AMF), configure the AMF to perform operations corresponding to the method of claim 10.

* * * * *